US012553055B2

(12) United States Patent
Kanemaki et al.

(10) Patent No.: US 12,553,055 B2
(45) Date of Patent: Feb. 17, 2026

(54) AUXIN-INDUCIBLE DEGRON SYSTEM KIT AND USE THEREOF

(71) Applicants: Inter-University Research Institute Corporation Research Organization of Information and Systems, Tokyo (JP); KAKE EDUCATIONAL INSTITUTION, Okayama (JP)

(72) Inventors: Masato Kanemaki, Mishima (JP); Ken-Ichiro Hayashi, Okayama (JP)

(73) Assignees: Inter-University Research Institute Corporation Research Organization of Information and Systems, Tokyo (JP); KAKE EDUCATIONAL INSTITUTION, Okayama (JP)

( * ) Notice: Subject to any disclaimer, the term of this patent is extended or adjusted under 35 U.S.C. 154(b) by 997 days.

(21) Appl. No.: 17/620,977

(22) PCT Filed: Apr. 30, 2020

(86) PCT No.: PCT/JP2020/018237
§ 371 (c)(1),
(2) Date: Dec. 20, 2021

(87) PCT Pub. No.: WO2021/009990
PCT Pub. Date: Jan. 21, 2021

(65) Prior Publication Data
US 2022/0380782 A1 Dec. 1, 2022

(30) Foreign Application Priority Data
Jul. 16, 2019 (JP) ................. 2019-131464

(51) Int. Cl.
*A01K 67/0275* (2024.01)
*C12N 9/10* (2006.01)
*C12N 15/63* (2006.01)
*C12N 15/90* (2006.01)

(52) U.S. Cl.
CPC ........ *C12N 15/635* (2013.01); *A01K 67/0275* (2013.01); *C12N 9/104* (2013.01); *C12N 15/90* (2013.01); *A01K 2217/052* (2013.01); *A01K 2217/203* (2013.01); *A01K 2227/105* (2013.01); *A01K 2267/0393* (2013.01); *C07K 2319/95* (2013.01); *C12N 2310/20* (2017.05)

(58) Field of Classification Search
CPC .................................................. C12N 15/635
See application file for complete search history.

(56) References Cited

U.S. PATENT DOCUMENTS

2012/0115232 A1  5/2012 Kanemaki et al.

FOREIGN PATENT DOCUMENTS

| CN | 102676545 A | 9/2012 |
|---|---|---|
| CN | 114127294 A | 3/2022 |
| JP | A-2008-187958 | 8/2008 |
| WO | WO 2010/125620 A1 | 11/2010 |
| WO | WO 2013/073653 A1 | 5/2013 |
| WO | WO 2017/029833 A1 | 2/2017 |
| WO | WO 2018/164214 A1 | 9/2018 |
| WO | WO 2020/193867 A1 | 10/2020 |

OTHER PUBLICATIONS

Database CHEMCATS, online, Accession No. 0998366508, Mar. 1, 2019 (Cited on applicant's IDS filed Mar. 2, 2022) (Year: 2019).*
Uchida, Naoyuki, et al. "Chemical hijacking of auxin signaling with an engineered auxin-TIR1 pair." Nature Chemical Biology 14.3 (2018): 299-305. (Cited on applicant's IDS filed Mar. 2, 2022) (Year: 2018).*
Nishimura, Kohei, et al. Nature methods 6.12 (2009): 917-922. (Year: 2009).*
Nishimura, Kohei, et al. Nature methods 6.12 (2009): 917-922. Supplementary figures and Text (Year: 2009).*
Nishimura, Kohei, et al. Nature methods 6.12 (2009): 917-922. Methods (Year: 2009).*
Uchida, Naoyuki, et al. Nature Chemical Biology 14.3 (2018): 299-305. (Year: 2018).*
Haldeman, Jonathan M., et al. Nucleic acids research 47.4 (Published online: 2018): e23-e23. (Year: 2018).*
Nishimura, Kohei, and Tatsuo Fukagawa. Chromosome Research 25 (2017): 253-260. (Year: 2017).*
Nishimura, Kohei, and Tatsuo Fukagawa. Chromosome Research 25 (2017): 253-260. Supplementery Figure S1 (Year: 2017).*
WO2013073653 (English Machine Translation) (Published: May 23, 2013) (Year: 2013).*
Sequence Search Results (A_Geneseq database, Result 1) (hereinafter "SSR") (Year: 2025).*
CAS Registry No. 1368980-27-1, entered STN Apr. 16, 2012.
Chinese Office Action for Application No. 202080050923.1 mailed Jun. 28, 2024, 17 pages.
Chinese Office Action for Chinese Application No. 202080050921.2 mailed Jul. 18, 2023, 15 pages.
Sima et al., "Advances in primary auxin-responsive Aux/IAA gene family: a review", *Journal of Zhejiang A & F University* 32(2):313-318 (2015).
Camlin et al., "Auxin-inducible protein degradation as a novel approach for protein depletion and reverse genetic discoveries in mammalian ocytes", *Biology of Reproduction* 101(4):704-718 (2019).
European Search Report for EP Application No. 20840243.8, mailed May 26, 2023, 11 pages.

(Continued)

*Primary Examiner* — Maria G Leavitt
*Assistant Examiner* — Brendan Thomas Tinsley
(74) *Attorney, Agent, or Firm* — Lathrop GPM LLP; Brian C. Trinque; Tanya D'Souza

(57) ABSTRACT

An auxin-inducible degron system kit that controls degradation of a target protein in a non-plant-derived eukaryotic cell, the kit containing a first nucleic acid that encodes a mutant TIR1 family protein having a mutation at an auxin-binding site, an auxin analog that has an affinity to the mutant TIR1 family protein and a second nucleic acid that encodes a degradation tag containing at least a part of an Aux/IAA family protein and having an affinity to a complex of the mutant TIR1 family protein and the auxin analog.

5 Claims, 17 Drawing Sheets

Specification includes a Sequence Listing.

(56) References Cited

OTHER PUBLICATIONS

Holland et al., "Inducible, reversible system for the rapid and complete degradation of proteins in mammalian cells", *PNAS* 109(49):E3350-E3357 (2012).

Lambrus et al., "Applying the auxin-inducible degradation (AID) system for rapid protein depletion in mammalian cells", bioRxiv (2017), doi: 10.1101/182840, retrieved from the Internet: URL: https://www.biorxiv.org/content/10.1101/182840v1.full.pdf.

Nishimura et al., "An auxin-based degron system for the rapid depletion of proteins in nonplant cells", *Nature Methods* 6(12):917-923 (2009).

Raina et al., "PROTAC-induced BET protein degradation as a therapy for castration-resistant prostate cancer", *PNAS* 113(26):7124-7129 (2016).

Yamada et al., "A Super Strong Engineered Auxin-TIR1 Pair", *Plant and Cell Physiology* 59(8):1538-1544 (2018).

Zhang et al., "AIDing-targeted protein degradation in *Drosophila*", *The FEBS Journal* 284(8):1178-1181 (2017).

Bence et al., "Combining the auxin-inducible degradation system with CRISPR/Cas9-based genome editing for the conditional depletion of endogenous *Drosophila melanogaster* proteins", *The FEBS Journal* 284(7):1056-1069 (2017).

Extended European Search Report for EP Application No. 20840241.2, mailed Aug. 9, 2023, 10 pages.

Database CHEMCATS, online, Accession No. 0998366508, Mar. 1, 2019.

International Search Report for PCT International Patent Application No., PCT/JP2020/018237, mailed Jul. 14, 2020, with English translation.

International Search Report for PCT International Patent Application No. PCT/JP2020/018310, mailed Jul. 28, 2020, with English translation.

Natsume et al., Rapid Protein Depletion in Human Cells by Auxin-Inducible Degron Tagging with Short Homology Donors, Cell Reports, 2016, vol. 15, pp. 210-218.

Nishimura et al., An efficient method to generate conditional knockout cell lines for essential genes by combination of auxin-inducible degron tag and CRISPR/Cas9 Chromosome Res, 2017, vol. 25, pp. 253-260.

Uchida et al., Chemical hijacking of auxin signaling with an engineered auxin-TIR1 pair, Nat. Chem. Biol., 2018, vol. 14, No. 3, pp. 299-305.

Uchida et al., Chemical hijacking of auxin signaling with an engineered auxin-TIR1 pair, Nat. Chem. Biol., 2018, vol. 14, No. 3, pp. 299-305, supplementary information, discussion, Figure 1, Supplementary Figure 1.

Yesbolatova et al., Chemical and Genetical Improvement of Auxin-Inducible Degron (AID) technology, Abstract of Annual Meeting of the Molecular Biology Society of Japan, vol. 41, 1P-0747.

Yesbolatova et al., Constructing auxin-inducible degron mutants using an all-in-one vector, Pharmaceuticals, , vol. 13, No. 103, pp. 1-8, 2020.

Yesbolatova et al., Improvement of auxin degron (AID) technology by chemical biology method, Online abstracts of the 42nd annual academic conference of the Molecular Biology Society of Japan, 2019, 3P-0632.

Restriction Requirement for U.S. Appl. No. 17/620,993 mailed Oct. 10, 2024, 9 pages.

Zhang et al., "The auxin-inducible degradation (AID) system enables versatile conditional protein depletion of *C. elegans*", *Development* 142:4374-4384 (2015).

Li et al., "An efficient auxin-inducible degron system with low basal degradation in human cells", *Nature Methods* 16:866-869 (2019).

Nikkei Business Publications, Inc., "Piggybac Transposon Method", Nikkei Biotechnology and Business Online, 2018.

Sathyan et al., "An improved auxin-inducible degron system preserves native protein levels and enables rapid and specific protein depletion", *Genes & Development* 33:1441-1455 (2019).

Link, "*C. elegans* models of age-associated neurodegenerative diseases: lessons from transgenic worm models of Alzheimer's disease", *Experimental Gerontology* 41(10):1007-1013 (2006).

Tuite, "Chapter Nineteen—Yeast models of neurodegenerative diseases", *Progress in Molecular Biology and Translational Science* 168:351-379 (2019).

US Office Action for U.S. Appl. No. 17/620,993 mailed Feb. 12, 2025, 24 pages.

* cited by examiner (A)

control (+DMSO)    + 5Ph-IAA 1 day after treatment (B)

DHC1: 530 kDa

SEQUENCE LISTING

<160> NUMBER OF SEQ ID NOS: 8

<210> SEQ ID NO 1
<211> LENGTH: 1728
<212> TYPE: DNA
<213> ORGANISM: Oryza sativa

<400> SEQUENCE: 1

```
atgacgtact tcccggagga ggtggtggag cacatcttca gcttcctgcc ggcgcagcgc        60
gaccgcaaca cggtctcgct cgtctgcaag gtgtggtacg agatcgagag gctgagccgc       120
cgcggcgtct tcgtgggcaa ctgctacgcc gtgcgcgccg gccgcgtcgc cgcgcggttc       180
```

| | |
|---|---|
| cccaacgtgc gggcgctcac ggtgaagggg aagcccccact tcgccgactt caacctcgtg | 240 |
| cccccccgact ggggcggcta cgcggggccg tggatcgagg cggccgcgag ggatgccac | 300 |
| ggcctggagg agctcaggat gaagcggatg gtggtgtccg acgagagcct cgagctgctg | 360 |
| gctcgctcgt tcccgcggtt cagggctctt gttcttatca gctgcgaggg gttcagcact | 420 |
| gacgggctag ccgccgtcgc gagccattgc aagcttctga gggagttgga tttgcaggaa | 480 |
| aatgaagtgg aggatcgagg gcctaggtgg ctttcctgct ccctgattc ctgcacatca | 540 |
| cttgtctcat tgaattttgc ctgcatcaaa ggggaggtta atgctggttc actggagaga | 600 |
| cttgttagca ggtccccaaa cctgcggagt ttgaggctga atcgatctgt atcggtagat | 660 |
| acacttgcaa agatactact gcgtaccccct aacttggagg atttggggac agggaatttg | 720 |
| acagatgact tccaaaactga gtcctacttt aagcttacca gtgctctgga gaaatgcaag | 780 |
| atgttgagga gtttgtctgg attctgggat gcttctcctg tttgcctgtc atttatctac | 840 |
| cccctgtgtg ctcaactgac aggattgaac ttgagctatg cccccacact tgatgcttct | 900 |
| gaccttacaa aaatgattag ccgctgtgtg aagctccaac gccctttgggt actggattgt | 960 |
| atctcggaca aaggcttgca agtggtggcc tccagttgca aagacttgca agaactcagg | 1020 |
| gtatttccat cagatttcta cgtagctggt tattctgcag tgacagagga gggacttgtt | 1080 |
| gcagtatcct ggctgctgtcc aaaactgaac tcactactgt acttctgtca ccaaatgact | 1140 |
| aatgctgcac tagttactgt cgccaagaac tgtccaaatt tcacacgatt cagactttgt | 1200 |
| attcttgagc cagggaagcc tgatgttgtg acaagccaac cattagatga aggctttgga | 1260 |
| gctattgttc gtgagtgcaa gggattacaa cgtttgtcaa tatctggtct tctcacagac | 1320 |
| aaagttttca tgtatattgg gaaatatgca aaacaacttg agatgctttc tatagcattt | 1380 |
| gctggtgaca gtgataaggg tatgatgcat gttatgaatg gatgcaagaa tttaaggaaa | 1440 |
| ctggagataa gagatagccc gtttggtgat gctgcactct tggggaattt tgctaggtac | 1500 |
| gagacaatgc gatcccttg gatgtcatct tgcaatgtca cgttaaaggg gtgccaagtc | 1560 |
| cttgcgtcaa agatgccgat gctcaatgtt gaggtcataa atgagcggga tggtagcaat | 1620 |
| gaaatggagg aaaaccatgg agatctgcct aaagtggaga aattatatgt gtaccgcaca | 1680 |
| actgctgggg cgagggatga tgcaccaaat tttgttaaaa tcctatag | 1728 |

<210> SEQ ID NO 2
<211> LENGTH: 1728
<212> TYPE: DNA
<213> ORGANISM: Artificial Sequence
<220> FEATURE:
<223> OTHER INFORMATION: OsTIR1 DNA optimized for human codon

<400> SEQUENCE: 2

| | |
|---|---|
| atgacatact ttcctgaaga ggtcgtcgaa cacattttta gcttcctgcc tgcacagaga | 60 |
| gatagaaaca cagtgagcct ggtctgcaaa gtgtggtacg agatcgaacg cctgagccgg | 120 |
| agaggagtgt tcgtcggcaa ctgctatgct gtgagagcag gcagggtcgc cgctaggttt | 180 |
| ccaaatgtgc gcgcactgac cgtcaagggg aaaccccact tcgccgactt taacctggtg | 240 |
| cccccctgatt ggggaggata cgccggcccct tggatcgagg cagccgctcg cggctgtcat | 300 |
| ggactggagg aactgcgcat gaagcgaatg gtggtctctg acgaaagtct ggagctgctg | 360 |
| gctcggagct ccctaggtt tcgcgcactg gtgctgattt cttgcgaagg cttcagcacc | 420 |
| gatggactgc cagccgtggc ctcccactgt aagctgctgc gggagctgga cctcaggag | 480 |
| aatgaagtgg aggatagagg ccccagatgg ctgtcttgct tcccagactc atgtaccagc | 540 |

-continued

```
ctggtgtccc tgaactttgc ctgcatcaaa ggcgaagtga atgctgggtc cctggagcgg      600
ctggtctcaa gaagccccaa cctgaggtct ctgcggctga accggagcgt gagcgtggac      660
actctggcta agattctgct gagaaccect aacctggagg atctgggaac cggcaatctg      720
acagacgatt tccagacaga atcctacttt aaactgactt ctgccctgga agtgtaaa       780 atgctgagga gtctgtcagg attctgggat gcttcacccg tgtgcctgag ctttatctac      840
cctctgtgtg cacagctgac aggcctgaac ctgagctatg caccaaccct ggacgccagt      900
gatctgacaa agatgatctc acgctgcgtg aaactccagc gactgtgggt gctggactgt      960
atttccgata aggggctcca ggtggtcgcc agctcctgca aggacctcca ggagctgaga     1020
gtgttcccat ctgatttta cgtggccgga tatagtgctg tcactgagga aggcctggtg     1080
gcagtctcac tgggatgccc aaagctgaac agcctgctgt atttctgtca tcagatgact     1140
aatgctgcac tggtgaccgt cgccaagaac tgccctaatt tcacccgatt tcggctgtgt     1200
attctggaac caggcaaacc cgacgtggtc acatcccagc cactggatga agggtttgga     1260
gctatcgtga gagagtgcaa gggactccag aggctgagca tttccggcct gctgacagac     1320
aaagtgttca tgtacatcgg caagtatgct aagcagctgg agatgctgag cattgcattt     1380
gccggagact ccgataaggg catgatgcac gtgatgaacg ggtgtaagaa tctgcgaaaa     1440
ctggaaatcc gggacagccc tttcggggat gccgctctgc tgggaaactt gccagatac     1500 gagacaatga ggagcctgtg gatgtctagt tgcaatgtga ctctgaaggg ctgtcaggtc     1560
ctggctagta aaatgcctat gctgaacgtg gaagtcatta atgagcggga cgggtctaac     1620
gaaatggagg aaaatcatgg cgacctgcca aaggtggaga actgtatgt gtatcggacc     1680 accgcagggg caagagatga tgctcccaac tttgtgaaga ttctgtga                  1728
```

<210> SEQ ID NO 3
<211> LENGTH: 575
<212> TYPE: PRT
<213> ORGANISM: Oryza sativa

<400> SEQUENCE: 3

```
Met Thr Tyr Phe Pro Glu Glu Val Val Glu His Ile Phe Ser Phe Leu
1               5                   10                  15

Pro Ala Gln Arg Asp Arg Asn Thr Val Ser Leu Val Cys Lys Val Trp
            20                  25                  30

Tyr Glu Ile Glu Arg Leu Ser Arg Arg Gly Val Phe Val Gly Asn Cys
        35                  40                  45

Tyr Ala Val Arg Ala Gly Arg Val Ala Ala Arg Phe Pro Asn Val Arg
    50                  55                  60

Ala Leu Thr Val Lys Gly Lys Pro His Phe Ala Asp Phe Asn Leu Val
65                  70                  75                  80

Pro Pro Asp Trp Gly Gly Tyr Ala Gly Pro Trp Ile Glu Ala Ala Ala
                85                  90                  95

Arg Gly Cys His Gly Leu Glu Glu Leu Arg Met Lys Arg Met Val Val
            100                 105                 110

Ser Asp Glu Ser Leu Glu Leu Leu Ala Arg Ser Phe Pro Arg Phe Arg
        115                 120                 125

Ala Leu Val Leu Ile Ser Cys Glu Gly Phe Ser Thr Asp Gly Leu Ala
    130                 135                 140

Ala Val Ala Ser His Cys Lys Leu Leu Arg Glu Leu Asp Leu Gln Glu
145                 150                 155                 160
```

-continued

```
Asn Glu Val Glu Asp Arg Gly Pro Arg Trp Leu Ser Cys Phe Pro Asp
                165                 170                 175
Ser Cys Thr Ser Leu Val Ser Leu Asn Phe Ala Cys Ile Lys Gly Glu
            180                 185                 190
Val Asn Ala Gly Ser Leu Glu Arg Leu Val Ser Arg Ser Pro Asn Leu
        195                 200                 205
Arg Ser Leu Arg Leu Asn Arg Ser Val Ser Val Asp Thr Leu Ala Lys
    210                 215                 220
Ile Leu Leu Arg Thr Pro Asn Leu Glu Asp Leu Gly Thr Gly Asn Leu
225                 230                 235                 240
Thr Asp Asp Phe Gln Thr Glu Ser Tyr Phe Lys Leu Thr Ser Ala Leu
                245                 250                 255
Glu Lys Cys Lys Met Leu Arg Ser Leu Ser Gly Phe Trp Asp Ala Ser
            260                 265                 270
Pro Val Cys Leu Ser Phe Ile Tyr Pro Leu Cys Ala Gln Leu Thr Gly
        275                 280                 285
Leu Asn Leu Ser Tyr Ala Pro Thr Leu Asp Ala Ser Asp Leu Thr Lys
    290                 295                 300
Met Ile Ser Arg Cys Val Lys Leu Gln Arg Leu Trp Val Leu Asp Cys
305                 310                 315                 320
Ile Ser Asp Lys Gly Leu Gln Val Val Ala Ser Ser Cys Lys Asp Leu
                325                 330                 335
Gln Glu Leu Arg Val Phe Pro Ser Asp Phe Tyr Val Ala Gly Tyr Ser
            340                 345                 350
Ala Val Thr Glu Glu Gly Leu Val Ala Val Ser Leu Gly Cys Pro Lys
        355                 360                 365
Leu Asn Ser Leu Leu Tyr Phe Cys His Gln Met Thr Asn Ala Ala Leu
    370                 375                 380
Val Thr Val Ala Lys Asn Cys Pro Asn Phe Thr Arg Phe Arg Leu Cys
385                 390                 395                 400
Ile Leu Glu Pro Gly Lys Pro Asp Val Val Thr Ser Gln Pro Leu Asp
                405                 410                 415
Glu Gly Phe Gly Ala Ile Val Arg Glu Cys Lys Gly Leu Gln Arg Leu
            420                 425                 430
Ser Ile Ser Gly Leu Leu Thr Asp Lys Val Phe Met Tyr Ile Gly Lys
        435                 440                 445
Tyr Ala Lys Gln Leu Glu Met Leu Ser Ile Ala Phe Ala Gly Asp Ser
    450                 455                 460
Asp Lys Gly Met Met His Val Met Asn Gly Cys Lys Asn Leu Arg Lys
465                 470                 475                 480
Leu Glu Ile Arg Asp Ser Pro Phe Gly Asp Ala Ala Leu Leu Gly Asn
                485                 490                 495
Phe Ala Arg Tyr Glu Thr Met Arg Ser Leu Trp Met Ser Ser Cys Asn
            500                 505                 510
Val Thr Leu Lys Gly Cys Gln Val Leu Ala Ser Lys Met Pro Met Leu
        515                 520                 525
Asn Val Glu Val Ile Asn Glu Arg Asp Gly Ser Asn Glu Met Glu Glu
    530                 535                 540
Asn His Gly Asp Leu Pro Lys Val Glu Lys Leu Tyr Val Tyr Arg Thr
545                 550                 555                 560
Thr Ala Gly Ala Arg Asp Asp Ala Pro Asn Phe Val Lys Ile Leu
                565                 570                 575
```

-continued

```
<210> SEQ ID NO 4
<211> LENGTH: 575
<212> TYPE: PRT
<213> ORGANISM: Artificial Sequence
<220> FEATURE:
<223> OTHER INFORMATION: OsTIR1 F74A Protein

<400> SEQUENCE: 4

Met Thr Tyr Phe Pro Glu Glu Val Val Glu His Ile Phe Ser Phe Leu
1               5                   10                  15

Pro Ala Gln Arg Asp Arg Asn Thr Val Ser Leu Val Cys Lys Val Trp
            20                  25                  30

Tyr Glu Ile Glu Arg Leu Ser Arg Arg Gly Val Phe Val Gly Asn Cys
        35                  40                  45

Tyr Ala Val Arg Ala Gly Arg Val Ala Ala Arg Phe Pro Asn Val Arg
    50                  55                  60

Ala Leu Thr Val Lys Gly Lys Pro His Ala Ala Asp Phe Asn Leu Val
65                  70                  75                  80

Pro Pro Asp Trp Gly Gly Tyr Ala Gly Pro Trp Ile Glu Ala Ala Ala
                85                  90                  95

Arg Gly Cys His Gly Leu Glu Glu Leu Arg Met Lys Arg Met Val Val
            100                 105                 110

Ser Asp Glu Ser Leu Glu Leu Leu Ala Arg Ser Phe Pro Arg Phe Arg
        115                 120                 125

Ala Leu Val Leu Ile Ser Cys Glu Gly Phe Ser Thr Asp Gly Leu Ala
    130                 135                 140

Ala Val Ala Ser His Cys Lys Leu Leu Arg Glu Leu Asp Leu Gln Glu
145                 150                 155                 160

Asn Glu Val Glu Asp Arg Gly Pro Arg Trp Leu Ser Cys Phe Pro Asp
                165                 170                 175

Ser Cys Thr Ser Leu Val Ser Leu Asn Phe Ala Cys Ile Lys Gly Glu
            180                 185                 190

Val Asn Ala Gly Ser Leu Glu Arg Leu Val Ser Arg Ser Pro Asn Leu
        195                 200                 205

Arg Ser Leu Arg Leu Asn Arg Ser Val Ser Val Asp Thr Leu Ala Lys
    210                 215                 220

Ile Leu Leu Arg Thr Pro Asn Leu Glu Asp Leu Gly Thr Gly Asn Leu
225                 230                 235                 240

Thr Asp Asp Phe Gln Thr Glu Ser Tyr Phe Lys Leu Thr Ser Ala Leu
                245                 250                 255

Glu Lys Cys Lys Met Leu Arg Ser Leu Ser Gly Phe Trp Asp Ala Ser
            260                 265                 270

Pro Val Cys Leu Ser Phe Ile Tyr Pro Leu Cys Ala Gln Leu Thr Gly
        275                 280                 285

Leu Asn Leu Ser Tyr Ala Pro Thr Leu Asp Ala Ser Asp Leu Thr Lys
    290                 295                 300

Met Ile Ser Arg Cys Val Lys Leu Gln Arg Leu Trp Val Leu Asp Cys
305                 310                 315                 320

Ile Ser Asp Lys Gly Leu Gln Val Val Ala Ser Ser Cys Lys Asp Leu
                325                 330                 335

Gln Glu Leu Arg Val Phe Pro Ser Asp Phe Tyr Val Ala Gly Tyr Ser
            340                 345                 350

Ala Val Thr Glu Glu Gly Leu Val Ala Val Ser Leu Gly Cys Pro Lys
        355                 360                 365

Leu Asn Ser Leu Leu Tyr Phe Cys His Gln Met Thr Asn Ala Ala Leu
```

|     |     |     |     | 370 |     |     |     | 375 |     |     |     | 380 |     |     |
| --- | --- | --- | --- | --- | --- | --- | --- | --- | --- | --- | --- | --- | --- | --- |
| Val | Thr | Val | Ala | Lys | Asn | Cys | Pro | Asn | Phe | Thr | Arg | Phe | Arg | Leu | Cys
385            390                      395                      400

Ile Leu Glu Pro Gly Lys Pro Asp Val Val Thr Ser Gln Pro Leu Asp
                405                 410                 415

Glu Gly Phe Gly Ala Ile Val Arg Glu Cys Lys Gly Leu Gln Arg Leu
            420                 425                 430

Ser Ile Ser Gly Leu Leu Thr Asp Lys Val Phe Met Tyr Ile Gly Lys
        435                 440                 445

Tyr Ala Lys Gln Leu Glu Met Leu Ser Ile Ala Phe Ala Gly Asp Ser
    450                 455                 460

Asp Lys Gly Met Met His Val Met Asn Gly Cys Lys Asn Leu Arg Lys
465                 470                 475                 480

Leu Glu Ile Arg Asp Ser Pro Phe Gly Asp Ala Ala Leu Leu Gly Asn
                485                 490                 495

Phe Ala Arg Tyr Glu Thr Met Arg Ser Leu Trp Met Ser Ser Cys Asn
            500                 505                 510

Val Thr Leu Lys Gly Cys Gln Val Leu Ala Ser Lys Met Pro Met Leu
        515                 520                 525

Asn Val Glu Val Ile Asn Glu Arg Asp Gly Ser Asn Glu Met Glu Glu
    530                 535                 540

Asn His Gly Asp Leu Pro Lys Val Glu Lys Leu Tyr Val Tyr Arg Thr
545                 550                 555                 560

Thr Ala Gly Ala Arg Asp Asp Ala Pro Asn Phe Val Lys Ile Leu
                565                 570                 575

<210> SEQ ID NO 5
<211> LENGTH: 1728
<212> TYPE: DNA
<213> ORGANISM: Artificial Sequence
<220> FEATURE:
<223> OTHER INFORMATION: OsTIR1 F74A DNA

<400> SEQUENCE: 5

```
atgacatact tcctgaaga ggtcgtcgaa cacatttttta gcttcctgcc tgcacagaga      60
gatagaaaca cagtgagcct ggtctgcaaa gtgtggtacg agatcgaacg cctgagccgg     120
agaggagtgt tcgtcggcaa ctgctatgct gtgagagcag gcagggtcgc cgctaggttt     180
ccaaatgtgc gcgcactgac cgtcaagggg aaaccccacg ccgccgactt taacctggtg     240
cccctgatt ggggaggata cgccggcccct tggatcgagg cagccgctcg cggctgtcat     300
ggactggagg aactgcgcat gaagcgaatg gtggtctctg acgaaagtct ggagctgctg     360
gctcggagct ccctaggtt tcgcgcactg gtgctgattt cttgcgaagg cttcagcacc     420
gatggactgg cagccgtggc ctcccactgt aagctgctgc gggagctgga cctccaggag     480
aatgaagtgg aggatagagg ccccagatgg ctgtcttgct cccagactc atgtaccagc     540
ctggtgtccc tgaactttgc ctgcatcaaa ggcgaagtga atgctgggtc cctggagcgg     600
ctggtctcaa gaagccccaa cctgaggtct ctgcggctga accggagcgt gagcgtggac     660
actctggcta agattctgct gagaacccct aacctggagg atctgggaac cggcaatctg     720
acagacgatt tccagacaga atcctacttt aaactgactt ctgccctgga agtgtaaa     780
atgctgagga gtctgtcagg attctgggat gcttcacccg tgtgcctgag ctttatctac     840
cctctgtgtg cacagctgac aggcctgaac ctgagctatg caccaaccct ggacgccagt     900
gatctgacaa agatgatctc acgctgcgtg aaactccagc gactgtgggt gctggactgt     960
```

-continued

```
atttccgata agggctcca ggtggtcgcc agctcctgca aggacctcca ggagctgaga    1020
gtgttcccat ctgattttta cgtggccgga tatagtgctg tcactgagga aggcctggtg    1080
gcagtctcac tgggatgccc aaagctgaac agcctgctgt atttctgtca tcagatgact    1140
aatgctgcac tggtgaccgt cgccaagaac tgccctaatt tcacccgatt tcggctgtgt    1200
attctggaac caggcaaacc cgacgtggtc acatcccagc cactggatga agggtttgga    1260
gctatcgtga gagagtgcaa gggactccag aggctgagca tttccggcct gctgacagac    1320
aaagtgttca tgtacatcgg caagtatgct aagcagctgg agatgctgag cattgcattt    1380
gccggagact ccgataaggg catgatgcac gtgatgaacg ggtgtaagaa tctgcgaaaa    1440
ctggaaatcc gggacagccc tttcggggat gccgctctgc tgggaaactt tgccagatac    1500
gagacaatga ggagcctgtg gatgtctagt tgcaatgtga ctctgaaggg ctgtcaggtc    1560
ctggctagta aaatgcctat gctgaacgtg gaagtcatta atgagcggga cgggtctaac    1620
gaaatggagg aaaatcatgg cgacctgcca aaggtggaga aactgtatgt gtatcggacc    1680
accgcagggg caagagatga tgctcccaac tttgtgaaga ttctgtga                 1728
```

<210> SEQ ID NO 6
<211> LENGTH: 575
<212> TYPE: PRT
<213> ORGANISM: Artificial Sequence
<220> FEATURE:
<223> OTHER INFORMATION: OsTIR1 F74G Protein

<400> SEQUENCE: 6

```
Met Thr Tyr Phe Pro Glu Glu Val Val Glu His Ile Phe Ser Phe Leu
1               5                   10                  15

Pro Ala Gln Arg Asp Arg Asn Thr Val Ser Leu Val Cys Lys Val Trp
            20                  25                  30

Tyr Glu Ile Glu Arg Leu Ser Arg Arg Gly Val Phe Gly Asn Cys
        35                  40                  45

Tyr Ala Val Arg Ala Gly Arg Val Ala Ala Arg Phe Pro Asn Val Arg
    50                  55                  60

Ala Leu Thr Val Lys Gly Lys Pro His Gly Ala Asp Phe Asn Leu Val
65                  70                  75                  80

Pro Pro Asp Trp Gly Gly Tyr Ala Gly Pro Trp Ile Glu Ala Ala
                85                  90                  95

Arg Gly Cys His Gly Leu Glu Glu Leu Arg Met Lys Arg Met Val Val
            100                 105                 110

Ser Asp Glu Ser Leu Glu Leu Leu Ala Arg Ser Phe Pro Arg Phe Arg
        115                 120                 125

Ala Leu Val Leu Ile Ser Cys Glu Gly Phe Ser Thr Asp Gly Leu Ala
    130                 135                 140

Ala Val Ala Ser His Cys Lys Leu Leu Arg Glu Leu Asp Leu Gln Glu
145                 150                 155                 160

Asn Glu Val Glu Asp Arg Gly Pro Arg Trp Leu Ser Cys Phe Pro Asp
                165                 170                 175

Ser Cys Thr Ser Leu Val Ser Leu Asn Phe Ala Cys Ile Lys Gly Glu
            180                 185                 190

Val Asn Ala Gly Ser Leu Glu Arg Leu Val Ser Arg Ser Pro Asn Leu
        195                 200                 205

Arg Ser Leu Arg Leu Asn Arg Ser Val Ser Val Asp Thr Leu Ala Lys
    210                 215                 220
```

```
Ile Leu Leu Arg Thr Pro Asn Leu Glu Asp Leu Gly Thr Gly Asn Leu
225                 230                 235                 240

Thr Asp Asp Phe Gln Thr Glu Ser Tyr Phe Lys Leu Thr Ser Ala Leu
            245                 250                 255

Glu Lys Cys Lys Met Leu Arg Ser Leu Ser Gly Phe Trp Asp Ala Ser
        260                 265                 270

Pro Val Cys Leu Ser Phe Ile Tyr Pro Leu Cys Ala Gln Leu Thr Gly
    275                 280                 285

Leu Asn Leu Ser Tyr Ala Pro Thr Leu Asp Ala Ser Asp Leu Thr Lys
290                 295                 300

Met Ile Ser Arg Cys Val Lys Leu Gln Arg Leu Trp Val Leu Asp Cys
305                 310                 315                 320

Ile Ser Asp Lys Gly Leu Gln Val Val Ala Ser Ser Cys Lys Asp Leu
                325                 330                 335

Gln Glu Leu Arg Val Phe Pro Ser Asp Phe Tyr Val Ala Gly Tyr Ser
            340                 345                 350

Ala Val Thr Glu Glu Gly Leu Val Ala Val Ser Leu Gly Cys Pro Lys
        355                 360                 365

Leu Asn Ser Leu Leu Tyr Phe Cys His Gln Met Thr Asn Ala Ala Leu
370                 375                 380

Val Thr Val Ala Lys Asn Cys Pro Asn Phe Thr Arg Phe Arg Leu Cys
385                 390                 395                 400

Ile Leu Glu Pro Gly Lys Pro Asp Val Val Thr Ser Gln Pro Leu Asp
                405                 410                 415

Glu Gly Phe Gly Ala Ile Val Arg Glu Cys Lys Gly Leu Gln Arg Leu
            420                 425                 430

Ser Ile Ser Gly Leu Leu Thr Asp Lys Val Phe Met Tyr Ile Gly Lys
        435                 440                 445

Tyr Ala Lys Gln Leu Glu Met Leu Ser Ile Ala Phe Ala Gly Asp Ser
450                 455                 460

Asp Lys Gly Met Met His Val Met Asn Gly Cys Lys Asn Leu Arg Lys
465                 470                 475                 480

Leu Glu Ile Arg Asp Ser Pro Phe Gly Asp Ala Ala Leu Leu Gly Asn
                485                 490                 495

Phe Ala Arg Tyr Glu Thr Met Arg Ser Leu Trp Met Ser Ser Cys Asn
            500                 505                 510

Val Thr Leu Lys Gly Cys Gln Val Leu Ala Ser Lys Met Pro Met Leu
        515                 520                 525

Asn Val Glu Val Ile Asn Glu Arg Asp Gly Ser Asn Glu Met Glu Glu
530                 535                 540

Asn His Gly Asp Leu Pro Lys Val Glu Lys Leu Tyr Val Tyr Arg Thr
545                 550                 555                 560

Thr Ala Gly Ala Arg Asp Asp Ala Pro Asn Phe Val Lys Ile Leu
                565                 570                 575
```

<210> SEQ ID NO 7
<211> LENGTH: 1728
<212> TYPE: DNA
<213> ORGANISM: Artificial Sequence
<220> FEATURE:
<223> OTHER INFORMATION: OsTIR1 F74G DNA

<400> SEQUENCE: 7
atgacatact tcctgaaga ggtcgtcgaa cacatttta gcttcctgcc tgcacagaga      60
gatagaaaca cagtgagcct ggtctgcaaa gtgtggtacg agatcgaacg cctgagccgg     120

```
agaggagtgt tcgtcggcaa ctgctatgct gtgagagcag gcagggtcgc cgctaggttt    180
ccaaatgtgc gcgcactgac cgtcaagggg aaaccccacg gcgccgactt taacctggtg    240 cccccctgatt ggggaggata cgccggcccct tggatcgagg cagccgctcg cggctgtcat   300
ggactggagg aactgcgcat gaagcgaatg gtggtctctg acgaaagtct ggagctgctg    360
gctcggagct ccctaggtt tcgcgcactg gtgctgattt cttgcgaagg cttcagcacc    420
gatggactgg cagccgtggc ctcccactgt aagctgctgc gggagctgga cctccaggag    480
aatgaagtgg aggatagagg ccccagatgg ctgtcttgct cccagactc atgtaccagc    540 ctggtgtccc tgaactttgc ctgcatcaaa ggcgaagtga atgctgggtc cctggagcgg    600
ctggtctcaa gaagccccaa cctgaggtct ctgcggctga accggagcgt gagcgtggac    660
actctggcta agattctgct gagaacccct aacctggagg atctgggaac cggcaatctg    720
acagacgatt tccagacaga atcctacttt aaactgactt ctgccctgga gaagtgtaaa    780
atgctgagga gtctgtcagg attctgggat gcttcacccg tgtgcctgag ctttatctac    840
cctctgtgtg cacagctgac aggcctgaac ctgagctatg caccaacccct ggacgccagt    900 gatctgacaa agatgatctc acgctgcgtg aaactccagc gactgtgggt gctggactgt    960
atttccgata agggctcca ggtggtcgcc agctcctgca aggacctcca ggagctgaga   1020
gtgttcccat ctgattttta cgtggccgga tatagtgctg tcactgagga aggcctggtg   1080
gcagtctcac tgggatgccc aaagctgaac agcctgctgt atttctgtca tcagatgact   1140
aatgctgcac tggtgaccgt cgccaagaac tgccctaatt tcacccgatt tcggctgtgt   1200
attctggaac caggcaaacc cgacgtggtc acatcccagc cactggatga agggtttgga   1260
gctatcgtga gagagtgcaa gggactccag aggctgagca tttccggcct gctgacagac   1320
aaagtgttca tgtacatcgg caagtatgct aagcagctgg agatgctgag cattgcattt   1380
gccggagact ccgataaggg catgatgcac gtgatgaacg ggtgtaagaa tctgcgaaaa   1440
ctggaaatcc gggacagccc tttcggggat gccgctctgc tgggaaactt tgccagatac   1500
gagacaatga ggagcctgtg gatgtctagt tgcaatgtga ctctgaaggg ctgtcaggtc   1560
ctggctagta aaatgcctat gctgaacgtg gaagtcatta atgagcggga cgggtctaac   1620
gaaatggagg aaaatcatgg cgacctgcca aaggtggaga aactgtatgt gtatcggacc   1680
accgcagggg caagagatga tgctcccaac tttgtgaaga ttctgtga             1728
```

<210> SEQ ID NO 8
<211> LENGTH: 68
<212> TYPE: PRT
<213> ORGANISM: Artificial Sequence
<220> FEATURE:
<223> OTHER INFORMATION: Mini auxin inducible degron

<400> SEQUENCE: 8

```
Lys Glu Lys Ser Ala Cys Pro Lys Asp Pro Ala Lys Pro Pro Ala Lys
1               5                  10                  15

Ala Gln Val Val Gly Trp Pro Pro Val Arg Ser Tyr Arg Lys Asn Val
            20                  25                  30
```

```
Met Val Ser Cys Gln Lys Ser Ser Gly Gly Pro Glu Ala Ala Ala Phe
            35                  40                  45

Val Lys Val Ser Met Asp Gly Ala Pro Tyr Leu Arg Lys Ile Asp Leu
    50                  55                  60

Arg Met Tyr Lys
65
```

AUXIN-INDUCIBLE DEGRON SYSTEM KIT AND USE THEREOF

TECHNICAL FIELD

The present invention relates to an auxin-inducible degron system kit and a use thereof. Specifically, the present invention relates to an auxin-inducible degron system kit, a target protein degradation method, a target protein degradation inducer and a cell.

Priority is claimed on Japanese Patent Application No. 2019-131464, filed in Japan on Jul. 16, 2019, the content of which is incorporated herein by reference.

BACKGROUND ART

The present inventors have thus far developed a protein degradation control technology called an auxin-inducible degron system (for example, refer to Patent Literature 1 to 3). In this system, a TIR1 that configures an auxin-responsive ubiquitin ligase is introduced into a cell derived from a eukaryote such as a yeast or an animal cell, and the degradation of a target protein to which a degradation tag (a plant-derived Aux/IAA family protein or a partial protein thereof; also referred to as a degron) has been added is controlled by adjusting the presence or absence or timing of the addition of an auxin.

The method for controlling the degradation of a target protein developed by the present inventors (also referred to as auxin-inducible degron method) has already been broadly used for research in cell biology, and the use of this method for model organisms such as yeasts, nematodes, *Drosophila* and zebrafish is also underway.

CITATION LIST

Patent Literature

Patent Literature 1

Japanese Unexamined Patent Application, First Publication No. 2008-187958

Patent Literature 2

PCT International Publication No. WO 2010/125620

Patent Literature 3

PCT International Publication No. WO 2013/073653

SUMMARY OF INVENTION

Technical Problem

The use of a conventional auxin-inducible degron method makes it possible to rapidly degrade a target protein to which a degradation tag (degron) has been added by the addition of an auxin. However, in the conventional auxin-inducible degron method, even when no auxin is added, weak degradation of a target protein occurs, which makes strict expression control difficult. In addition, a relatively high concentration (100 μM or higher) of an auxin is used for degradation induction, and thus there has been concern over a toxic impact of the auxin particularly on multicellular animals.

The present invention has been made in consideration of the above-described circumstances and provides an auxin-inducible degron system kit enabling strict and full control of protein degradation, a target protein degradation method, a target protein degradation inducer, a cell and a compound.

Solution to Problem

The present invention includes the following aspects.

[1] An auxin-inducible degron system kit that controls degradation of a target protein in a non-plant-derived eukaryotic cell, the kit containing a first nucleic acid that encodes a mutant TIR1 family protein having a mutation at an auxin-binding site, an auxin analog that has an affinity to the mutant TIR1 family protein, and a second nucleic acid that encodes a degradation tag containing at least a part of an Aux/IAA family protein and having an affinity to a complex of the mutant TIR1 family protein and the auxin analog.

[2] The kit according to [1], further containing a third nucleic acid that encodes the target protein linked upstream or downstream of the second nucleic acid.

[3] The kit according to [1] or [2], in which the mutant TIR1 family protein is a rice-derived protein.

[4] The kit according to any one of [1] to [3], in which the mutant TIR1 family protein is a protein in which an F74 of OsTIR1 has mutated into A, G or S.

[5] The kit according to any one of [1] to [4], in which the auxin analog is a compound represented by the following general formula (I) or an ester body thereof.

[Chem. 1]

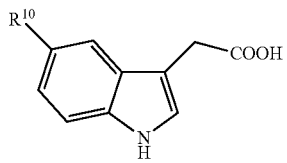

(I)

(In the general formula (I), $R^{10}$ is a cyclic aliphatic hydrocarbon group in which a substituent may be present and some carbon atoms that configure a ring may be substituted with heteroatoms or an aromatic hydrocarbon group in which a substituent may be present and some carbon atoms that configure a ring may be substituted with heteroatoms.)

[6] The kit according to any one of [2] to [5],
further comprising:
 a fourth nucleic acid that encodes a linker for controlling a plurality of genes with one promoter and that is linked between the first nucleic acid, and the second nucleic acid and the third nucleic acid.

[7] The kit according to any one of [2] to [6], further containing a transposon vector containing the first nucleic acid and/or the second nucleic acid and the third nucleic acid.

[8] The kit according to any one of [1] to [7], further containing a target genome DNA cleavage enzyme that encodes an endogenous target protein or a fifth nucleic acid that encodes the enzyme.

[9] The kit according to any one of claims [1] to [8], further containing a non-plant-derived eukaryotic cell having the first nucleic acid on a chromosome.

[10] A target protein degradation method, in which the kit according to any one of [1] to [9] is used.

[11] A target protein degradation inducer that is used in an auxin-inducible degron system that controls degradation of a target protein in a non-plant-derived eukaryotic cell, the inducer containing a compound represented by the following general formula (I) or an ester body thereof.

[Chem. 2]

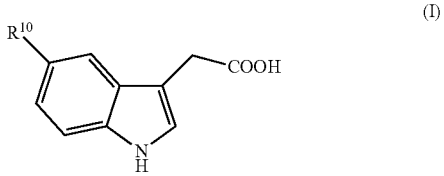

(I)

(In the general formula (I), $R^{10}$ is a cyclic aliphatic hydrocarbon group in which a substituent may be present and some carbon atoms that configure a ring may be substituted with heteroatoms or an aromatic hydrocarbon group in which a substituent may be present and some carbon atoms that configure a ring may be substituted with heteroatoms.)

[12] A non-plant-derived eukaryotic cell that is used in an auxin-inducible degron system that controls the degradation of a target protein and has a chromosome containing a first nucleic acid that encodes a mutant TIR1 family protein having a mutation at an auxin-binding site.

[13] The cell according to [12], in which the mutant TIR1 family protein is a rice-derived protein.

[14] The cell according to [12] or [13], in which the mutant TIR1 family protein is a protein in which an F74 of OsTIR1 has mutated into A, G or S.

[15] A compound represented by the following general formula (II).

[Chem. 3]

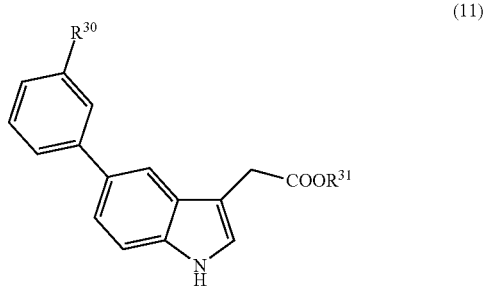

(II)

(In the general formula (II), $R^{30}$ represents a hydrogen atom, an alkyl group having 1 to 6 carbon atoms or a halogen atom and $R^{31}$ represents a hydrogen atom or an alkyl group having 1 to 6 carbon atoms. Here, in a case where $R^{30}$ is a hydrogen atom or an alkyl group having 1 to 6 carbon atoms, $R^{31}$ is an alkyl group having 1 to 6 carbon atoms.)

Advantageous Effects of Invention

According to the auxin-inducible degron system kit of the present invention, strict and full control of protein degradation is possible.

DESCRIPTION OF EMBODIMENTS

<<Auxin-Inducible Degron System Kit>>

Figure 1:
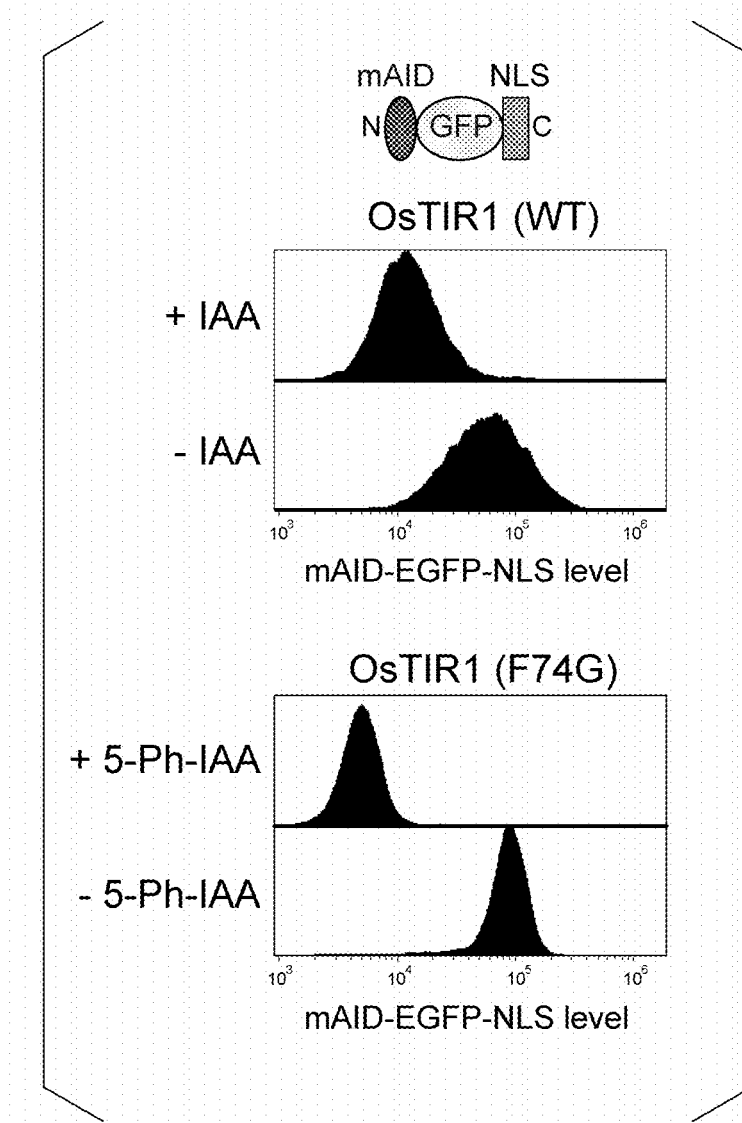
FIG. 1 shows the investigation results of degradation of a target protein in an OsTIR1(F74G)/mAID-EGFP-NLS expressing cell in Example 1.

A kit of the present invention is an auxin-inducible degron system kit that controls degradation of a target protein in a non-plant-derived eukaryotic cell, the kit containing a first nucleic acid that encodes a mutant TIR1 family protein having a mutation at an auxin-binding site, an auxin analog that has an affinity to the mutant TIR1 family protein, and a second nucleic acid that encodes a degradation tag containing at least a part of an Aux/IAA family protein and having an affinity to a complex of the mutant TIR1 family protein and the auxin analog.

An "auxin-inducible degron system" is a protein degradation control technology developed by the present inventors and is a system in which a plant-specific protein degradation system that is introduced by a plant hormone auxin is applied to a non-plant-derived eukaryotic cell (for example, refer to Patent Literature 1 to 3).

Specifically, this system is a system in which a plant-derived TIR1 family protein as an F-box protein, which is a subunit of an E3 ubiquitin ligase complex (SCF complex), and a target protein labeled with a peptide composed of a plant-derived Aux/IAA family protein or a partial sequence thereof are introduced into a non-plant-derived eukaryotic cell, whereby the TIR1 family protein, which is an auxin receptor, recognizes the peptide composed of the Aux/IAA family protein or the partial sequence thereof and degrades the target protein using a ubiquitin/proteasome degradation system in the non-plant-derived eukaryotic cell in an auxin-dependent manner.

In such a system, the present inventors found a problem of the target protein being degraded in an auxin-independent manner. Regarding such a problem, the present inventors found a combination of a mutant TIR1 family protein having a mutation at an auxin-binding site, an auxin analog that has an affinity to the mutant TIR1 family protein and a degradation tag that contains at least a part of an Aux/IAA family protein and has an affinity to a complex of the mutant TIR1 family protein and the auxin analog.

In addition, the present inventors found that the degradation of the target protein can be induced with a low concentration of the auxin analog.

According to the present invention, it is possible to provide an auxin-inducible degron system in which a target protein is hardly degraded when no auxin is added, but the degradation efficiency of the target protein is extremely high when an auxin is added.

<First Nucleic Acid>

In the present invention, the first nucleic acid encodes a mutant TIR1 family protein having a mutation at an auxin-binding site.

A TIR1 family protein is an F-box protein, which is a subunit that forms an E3 ubiquitin ligase complex (SCF complex) in protein degradation by an ubiquitin-proteasome system, and a plant-specific protein. The TIR1 family protein serves as a receptor of an auxin, which is a growth hormone, and is known to recognize an Aux/IAA family protein, which is an inhibiting factor of an auxin communication system, by receiving an auxin and to degrade a target protein.

As a gene that encodes the TIR1 family protein, the type thereof is not limited as long as the gene encodes plant-derived TIR1 family proteins. In addition, the type of a plant from which the TIR1 family protein is derived is also not limited, and examples thereof include *Arabidopsis*, rice, zinnia, pines, ferns, *Physcomitrella patens* and the like. Specific examples of the gene that encodes the TIR1 family protein include a TIR1 gene, an AFB1 gene, an AFB2 gene, an AFB3 gene, an FBX14 gene, an AFB5 gene and the like.

Among these, an OsTIR1 gene, which is a rice-derived TIR1 gene, is preferable. As such a gene, genes with an accession number NM_001059194 (GeneID: 4335696) or Os04g0395600 or an accession number EAY93933 or OsI_15707 that are registered in NCBI are exemplified, and more specifically, genes composed of a base sequence represented by the sequence number 1 are exemplified. Furthermore, genes composed of a base sequence represented by the sequence number 2, having codons optimized for human cells, are preferable.

In the present invention, the mutant TIR1 family protein has a mutation at an auxin-binding site. Such a mutant protein is not particularly limited as long as the mutant protein has an affinity to the auxin analog to be described below, but is preferably a protein in which the 74$^{th}$ F of OsTIR1 is mutated into A, G or S and more preferably a protein in which the 74$^{th}$ F of OsTIR1 has mutated into G.

Specifically, the mutant TIR1 family protein is particularly preferably a protein that is composed of sequences including any one of the following amino acid sequences (a) to (c) and is bound with the degradation tag through the complex with the auxin analog to guide the target protein to be degraded.

(a) An amino acid sequence in which the amino acid number 74 site of the amino acid sequence represented by the sequence number 3 is glycine.

(b) An amino acid sequence in which one to several amino acids are deleted, inserted, substituted or added in sites other than the amino acid number 74 site of the amino acid sequence (a).

(c) An amino acid sequence that is 80% or more identical at sites other than the amino acid number 74 site of the amino acid sequence (a).

The number of amino acids deleted, inserted, substituted or added in the amino acid sequence (b) is preferably 1 to 120, more preferably 1 to 60, still more preferably 1 to 20, particularly preferably 1 to 10 and most preferably 1 to 5.

In order to be functionally identical to a protein composed of sequences including the amino acid sequence (a), a protein is 80% or more identical. Regarding such an identity, the protein is more preferably 85% or more identical, still more preferably 90% or more identical, particularly preferably 95% or more identical and most preferably 99% or more identical.

As an F74A protein in OsTIR1, proteins composed of an amino acid sequence represented by the sequence number 4 are exemplified, and, as a gene that encodes the F74A protein in OsTIR1, genes composed of a base sequence represented by the sequence number 5 are exemplified.

As an F74G protein in OsTIR1, proteins composed of an amino acid sequence represented by the sequence number 6 are exemplified, and, as a gene that encodes the F74G protein in OsTIR1, genes composed of a base sequence represented by the sequence number 7 are exemplified.

The first nucleic acid that encodes the mutant TIR1 family protein may be DNA having an exon and an intron or may be cDNA composed of an exon. The first nucleic acid that encodes the mutant TIR1 family protein may be, for example, a full-length sequence in genome DNA or a full-length sequence in cDNA. In addition, the first nucleic acid that encodes the mutant TIR1 family protein may be a partial sequence in genome DNA or a partial sequence in cDNA as long as an expressed protein functions as TIR1.

In the present specification, "functioning as the TIR1 family protein" means that, for example, the expressed protein recognizes a degradation tag (a full-length Aux/IAA family protein or a partial protein) in the presence of the auxin analog. This is because the TIR1 family protein is capable of degrading target proteins labeled with a degradation tag as long as the TIR1 family protein is capable of recognizing the degradation tag.

In the kit of the present invention, it is preferable that a promotor sequence that controls the transcription of the first nucleic acid be operably linked to the 5' end of the first nucleic acid that encodes the TIR1 family protein. This makes it possible for the TIR1 family protein to be more reliably expressed.

In the present specification, "being operably linked" means a functional linkage between a gene expression control sequence (for example, a promotor or a series of transcription factor-binding sites) and a gene intended to be expressed (the first nucleic acid that encodes the TIR1 family protein). Here, "expression control sequence" means a sequence that is oriented for the transcription of a gene intended to be expressed (the first nucleic acid that encodes the TIR1 family protein).

The promotor is not particularly limited and can be appropriately determined depending on, for example, the type of a cell or the like. Specific examples of the promotor include a CMV promotor, a SV40 promotor, an EF1a promotor, an RSV promotor and the like.

In the kit of the present invention, the first nucleic acid that encodes the TIR1 family protein and the promotor sequence operably linked upstream may be in a form of being inserted into a vector.

The vector is preferably an expression vector. The expression vector is not particularly limited, and an expression vector suitable for the host cell can be used.

In the vector, a polyadenylation signal, an NLS, a marker gene of a fluorescent protein or the like may be operably linked to the 5' end or 3' end of the first nucleic acid that encodes the TIR1 family protein.

The kit of the present invention may contain a non-plant-derived eukaryotic cell having the first nucleic acid on a chromosome. Such a cell preferably has the first nucleic acid at a safe harbor site.

"Safe harbor site" means a gene region where constant and stable expression occurs and a region where a gene that is intrinsically encoded to this region can be kept alive even in the case of being defective or altered. In the case of inserting foreign DNA (a gene that encodes TIR1 in the present embodiment) into a safe harbor site using a CRISPR system, a PAM sequence is preferably present in the vicinity thereof. Examples of the safe harbor site include a GTP-binding protein 10 gene locus, a Rosa26 gene locus, a beta-actin gene locus, an AAVS1 (the AAV integration site 1) gene locus and the like. Among them, in the case of a human-derived cell, a foreign DNA is preferably inserted into the AAVS1 gene locus.

The cell is not particularly limited as long as the cell is a non-plant-derived eukaryotic cell, and examples thereof include cells of animals, fungi, protists and the like. Examples of the animals include mammals such as humans, mice, rats and rabbits, fish or amphibians such as zebrafish and *Xenopus laevis* and invertebrates such as *C. elegans* and *Drosophila*.

In addition, examples thereof also include established eukaryote-derived cells, ES cells and iPS cells. Specific examples of the eukaryotic cells include established human-derived cells, established mouse-derived cells, established chicken-derived cells, human ES cells, mouse ES cells, human iPS cells, mouse iPS cells and the like. Specific examples thereof include human HCT116 cells, human HT1080 cells, human NALM6 cells, human ES cells, human iPS cells, mouse ES cells, mouse iPS cells, chicken DT40 cells and the like.

In addition, examples of the fungi include *Saccharomyces cerevisiae*, fission yeast and the like.

<Auxin Analog>

In the present invention, the auxin analog is not particularly limited as long as the auxin analog has an affinity to the mutant TIR1 family protein, but is preferably a compound represented by the following general formula (I) or an ester body thereof.

[Chem. 4]

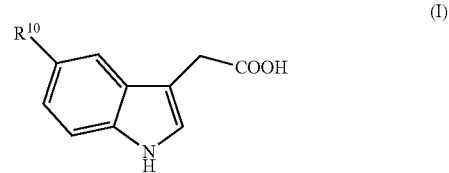

(I)

(In the general formula (I), $R^{10}$ is a cyclic aliphatic hydrocarbon group in which a substituent may be present and some carbon atoms that configure a ring may be substituted with heteroatoms or an aromatic hydrocarbon group in which a substituent may be present and some carbon atoms that configure a ring may be substituted with heteroatoms.)

[Cyclic Aliphatic Hydrocarbon Group]

The cyclic aliphatic hydrocarbon group as $R^{10}$ may be a monocyclic group or a polycyclic group.

As the monocyclic aliphatic hydrocarbon, a cyclopropyl group, a cyclobutyl group, a cyclopentyl group, a cyclohexyl group, a methylcyclohexyl group, a dimethylcyclohexyl group, a cycloheptyl group, a cyclooctyl group, a cyclononyl group and a cyclodecyl group are exemplified.

As the polycyclic aliphatic hydrocarbon group, a decahydronaphthyl group, an adamantyl group, a 2-alkyladamantan-2-yl group, a 1-(adamantan-1-yl)alkane-1-yl group, a norbornyl group, a methylnorbornyl group, an isobornyl group and the like are exemplified.

In the cyclic aliphatic hydrocarbon group, some carbon atoms that configure the ring may be substituted with heteroatoms. As the heteroatoms, an oxygen atom, a sulfur atom, a nitrogen atom and the like are exemplified. As such a heterocycle, pyrrolidine, tetrahydrofuran, tetrahydrothiophene, piperidine, tetrahydropyran, tetrahydrothiopyran, dioxane, dioxolane and the like are exemplified.

As the substituent, an alkyl group having 1 to 6 carbon atoms, an alkoxy group having 1 to 6 carbon atoms, a halogen atom and an aryl group having 6 to 30 carbon atoms are exemplified.

Examples of the alkyl group include a methyl group, an ethyl group, an n-propyl group, an isopropyl group, a cyclopropyl group, an n-butyl group, an isobutyl group, a sec-butyl group, a tert-butyl group, a cyclobutyl group, an n-pentyl group, an isopentyl group, a sec-pentyl group, a neopentyl group, a tert-pentyl group, a cyclopentyl group, a 2,3-dimethylpropyl group, a 1-ethylpropyl group, a 1-methylbutyl group, a 2-methylbutyl group, an n-hexyl group, an isohexyl group, a cyclohexyl group, a 2-methylpentyl group, a 3-methylpentyl group, a 1,1,2-trimethylpropyl group, a 3,3-dimethylbutyl group and the like.

As the alkoxy group, alkoxy groups in which the R portion of —OR is the same as that of the above-described alkyl group having 1 to 6 carbon atoms are exemplified. Among them, as the alkoxy group having the number of carbons, a methoxy group or an ethoxy group is preferable.

Examples of the halogen atom include a fluorine atom, a chlorine atom, a bromine atom, an iodine atom and the like. Among them, a fluorine atom or a chlorine atom is preferable as the halogen atom.

As the aryl group, a phenyl group, a naphthyl group, a benzyl group, a phenethyl group, a biphenyl group, a pentarenyl group, an indenyl group, an anthranyl group, a tetracenyl group, a pentasenyl group, a pyrenyl group, a peryleneyl group, a fluorenyl group and a phenanthryl group are exemplified.

[Aromatic Hydrocarbon Group]

As the aromatic hydrocarbon group as $R^{10}$, the above-described aryl group having 6 to 30 carbon atoms is exemplified.

In the aromatic hydrocarbon group, some carbon atoms that configure the ring may be substituted with heteroatoms. As the heteroatoms, an oxygen atom, a sulfur atom, a nitrogen atom and the like are exemplified. As such a heterocycle, pyrrole, furan, thiophene, pyridine, imidazole, pyrazole, oxazole, thiazole, pyridazine, pyrimidine, indole, benzimidazole, quinoline, isoquinoline, chromene, isochromene and the like are exemplified.

As the substituent, the same substituents as exemplified in the [Cyclic aliphatic hydrocarbon group] section are exemplified.

The ester body of the compound represented by the general formula (I) is an ester body in which the hydrogen atom in —COOH of the general formula (I) has been substituted with a hydrocarbon group and preferably an ester body in which the hydrogen atom is substituted with an alkyl group.

As such an alkyl group, an alkyl group having 1 to 6 carbon atoms is preferable, and a methyl group, an ethyl group, an n-propyl group, an isopropyl group, a cyclopropyl group, an n-butyl group, an isobutyl group, a sec-butyl group, a tert-butyl group, a cyclobutyl group, an n-pentyl group, an isopentyl group, a sec-pentyl group, a neopentyl group, a tert-pentyl group, a cyclopentyl group, a 2,3-dimethylpropyl group, a 1-ethylpropyl group, a 1-methylbutyl group, a 2-methylbutyl group, an n-hexyl group, an isohexyl group, a cyclohexyl group, a 2-methylpentyl group, a 3-methylpentyl group, a 1,1,2-trimethylpropyl group, a 3,3-dimethylbutyl group and the like are exemplified.

As the compound represented by the general formula (I) in which $R^{10}$ is an aromatic hydrocarbon group, a compound represented by the following general formula (I-1) or an ester body thereof is preferable.

[Chem. 5]

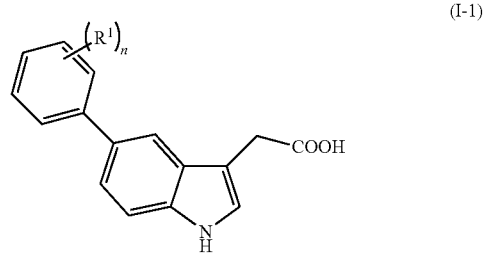

(I-1)

(In the general formula (I-1), $R^1$ is an alkyl group having 1 to 6 carbon atoms, an alkoxy group having 1 to 6 carbon atoms, a halogen atom or an aryl group having 6 to 30 carbon atoms. n is an integer of 0 to 5, and, in a case where n is an integer of 2 to 5, n $R^1$'s may be identical to or different from each other.)

Examples of the halogen atom as $R^1$ include a fluorine atom, a chlorine atom, a bromine atom, an iodine atom and the like. Among them, a fluorine atom or a chlorine atom is preferable as the halogen atom.

Examples of the alkyl group as $R^1$ include a methyl group, an ethyl group, an n-propyl group, an isopropyl group, a cyclopropyl group, an n-butyl group, an isobutyl group, a sec-butyl group, a tert-butyl group, a cyclobutyl group, an n-pentyl group, an isopentyl group, a sec-pentyl group, a neopentyl group, a tert-pentyl group, a cyclopentyl group, a 2,3-dimethylpropyl group, a 1-ethylpropyl group, a 1-methylbutyl group, a 2-methylbutyl group, an n-hexyl group, an isohexyl group, a cyclohexyl group, a 2-methylpentyl group, a 3-methylpentyl group, a 1,1,2-trimethylpropyl group, a 3,3-dimethylbutyl group and the like. Among them, as the alkyl group having 1 to 6 carbon atoms, a methyl group or an ethyl group is preferable.

As the alkoxy group as $R^1$, alkoxy groups in which the R portion of —OR is the same as that of the above-described alkyl group having 1 to 6 carbon atoms are exemplified. Among them, as the alkoxy group having the number of carbons, a methoxy group or an ethoxy group is preferable.

As the aryl group as $R^1$, a phenyl group, a naphthyl group, a benzyl group, a phenethyl group, a biphenyl group, a pentarenyl group, an indenyl group, an anthranyl group, a tetracenyl group, a pentasenyl group, a pyrenyl group, a peryleneyl group, a fluorenyl group and a phenanthryl group are exemplified.

n of $R^1$ is an integer of 0 to 5 and preferably 0 to 3. In a case where the compound represented by the general formula (I-1) has a plurality of $R^1$'s, the following compound or an ester body thereof is exemplified.

[Chem. 6]

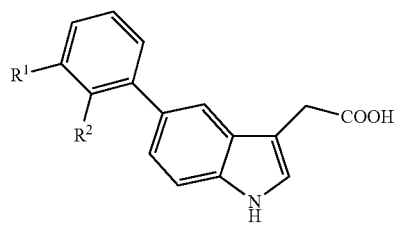
(I-1-1)

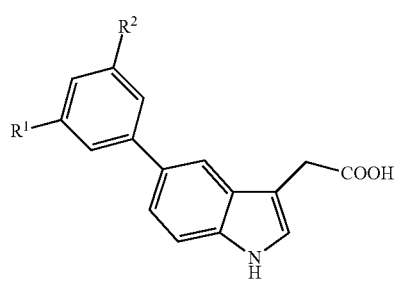
(I-1-2)

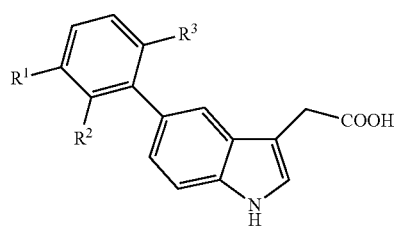
(I-1-3)

(In general formulae (I-1-1) to (I-1-3), $R^1$ to $R^3$ are each independently an alkyl group having 1 to 6 carbon atoms, an alkoxy group having 1 to 6 carbon atoms, a halogen atom or an aryl group having 6 to 30 carbon atoms.)

In the general formulae (I-1-1) to (I-1-3), $R^1$ to $R^3$ are the same as $R^1$ in the general formula (I-1).

In addition, as the compound represented by the general formula (I), compounds to be described below or ester bodies thereof are preferable.

A compound indicated by the following formula (I-1-4) (also referred to as 5-(3-MeOPh)-IAA).

A compound indicated by the following formula (I-1-5) (also referred to as 5-Ph-IAA).

A compound indicated by the following formula (I-1-6) (also referred to as 5-(3,4-diMePh)-IAA).

A compound indicated by the following formula (I-1-7) (also referred to as 5-(3-MePh)-IAA).

A compound indicated by the following formula (I-1-8) (also referred to as 5-(3-ClPh)-IAA).

[Chem. 7]

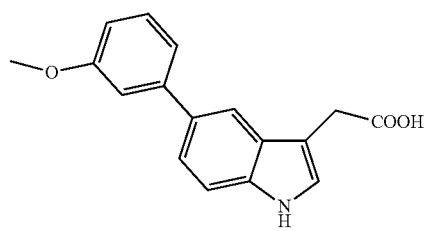
(I-1-4)

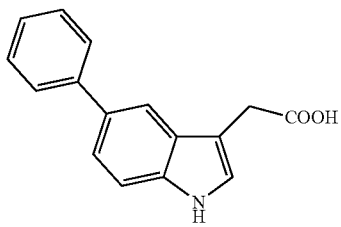
(I-1-5)

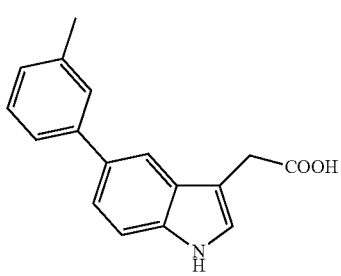
(I-1-6)

[Chem. 8]

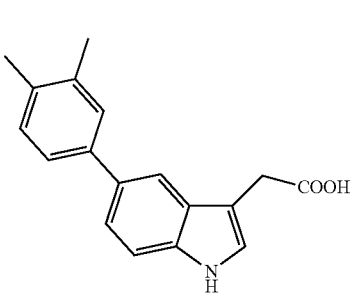
(I-1-7)

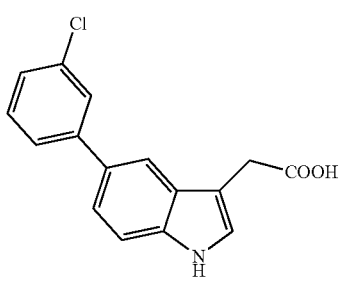
(I-1-8)

In addition, a compound indicated by the following formula (I-1-9) or an ester body thereof is also preferable.

[Chem. 9]

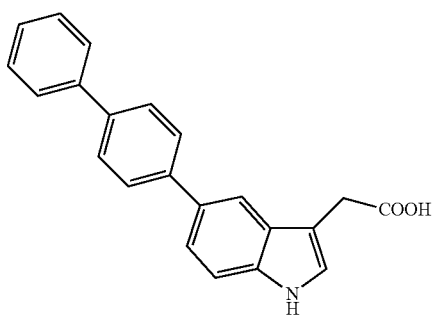
(I-1-9)

In addition, as the compound in which $R^{10}$ is an aromatic hydrocarbon group, compounds represented by the following formulae (I-2) to (I-5) or ester bodies thereof are also preferable.

[Chem. 10]

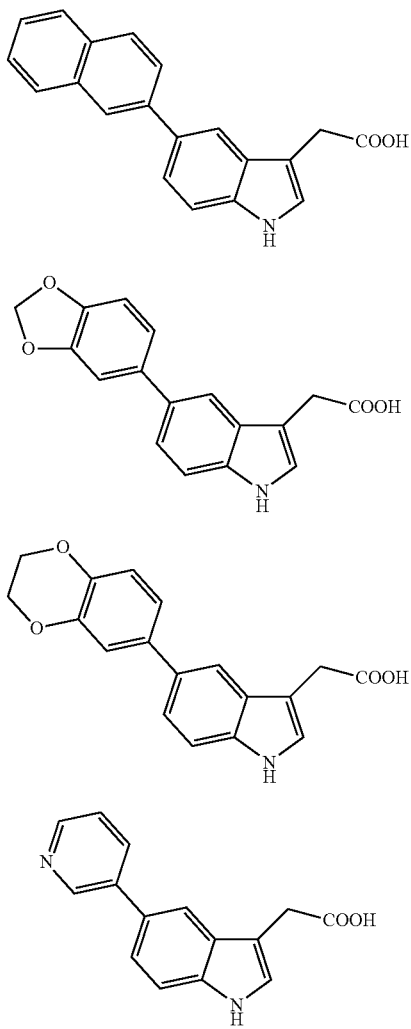

(I-2)

(I-3)

(I-4)

(I-5)

In addition, as the compound in which $R^{10}$ is a cyclic aliphatic hydrocarbon group, a compound represented by the following general formula (I-6) or an ester body thereof is also preferable.

[Chem. 11]

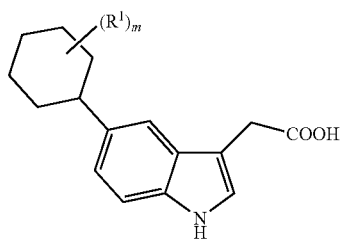

(I-6)

(In the general formula (I-6), $R^1$ is an alkyl group having 1 to 6 carbon atoms, an alkoxy group having 1 to 6 carbon atoms, a halogen atom or an aryl group having 6 to 30 carbon atoms. m is an integer of 0 to 11, and, in a case where m is an integer of 2 to 11, m $R^1$'s may be identical to or different from each other.)

$R^1$ is the same as $R^1$ exemplified in the general formula (I-1). m is preferably 0 to 6 and more preferably 0 to 3.

In addition, as the compound in which $R^{10}$ is a cyclic aliphatic hydrocarbon group, a compound represented by the formula (I-7) or an ester body thereof is also preferable.

[Chem. 12]

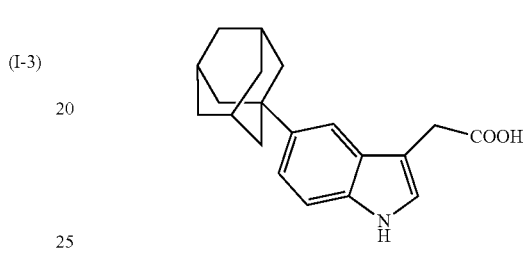

(I-7)

<Second Nucleic Acid>

In the present invention, the second nucleic acid encodes a degradation tag containing at least a part of an Aux/IAA family protein and having an affinity to a complex of the mutant TIR1 family protein and the auxin analog.

As a gene that encodes the Aux/IAA family protein, the type thereof is not particularly limited as long as the gene is a plant-derived Aux/IAA family gene. Specific examples of the gene that encodes the Aux/IAA family protein include an IAA1 gene, an IAA2 gene, an IAA3 gene, an IAA4 gene, an IAA5 gene, an IAA6 gene, an IAA7 gene, an IAA8 gene, an IAA9 gene, an IAA10 gene, an IAA11 gene, an IAA12 gene, an IAA13 gene, an IAA14 gene, an IAA15 gene, an IAA16 gene, an IAA17 gene, an IAA18 gene, an IAA19 gene, an IAA20 gene, an IAA26 gene, an IAA27 gene, an IAA28 gene, an IAA29 gene, an IAA30 gene, an IAA31 gene, an IAA32 gene, an IAA33 gene, an IAA34 gene and the like.

The kit of the present invention may have any one type of full-length or partial sequence of the gene that encodes the Aux/IAA family protein or may have two or more types thereof. For example, the sequence of an *Arabidopsis*-derived Aux/IAA family gene is registered in the *Arabidopsis* Information Resource (TAIR), and the accession number of each gene is as follows.

The IAA1 gene (AT4G14560), the IAA2 gene (AT3G23030), the IAA3 gene (AT1G04240), the IAA4 gene (AT5G43700), the IAA5 gene (AT1G15580), the IAA6 gene (AT1G52830), the IAA7 gene (AT3G23050), the IAA8 gene (AT2G22670), the IAA9 gene (AT5G65670), the IAA10 gene (AT1G04100), the IAA11 gene (AT4G28640), the IAA12 gene (AT1G04550), the IAA13 gene (AT2G33310), the IAA14 gene (AT4G14550), the IAA15 gene (AT1G80390), the IAA16 gene (AT3G04730), the IAA17 gene (AT1G04250), the IAA18 gene (AT1G51950), the IAA19 gene (AT3G15540), the IAA20 gene (AT2G46990), the IAA26 gene (AT3G16500), the IAA27 gene (AT4G29080), the IAA28 gene (AT5G25890), the IAA29 gene (AT4G32280), the IAA30 gene (AT3G62100), the IAA31 gene (AT3G17600), the IAA32 gene (AT2G01200), the IAA33 gene (AT5G57420), the IAA34 gene (AT1G15050).

Among them, the *Arabidopsis* IAA17 gene is preferable.

The degradation tag is not particularly limited as long as the degradation tag is bound with the complex of the mutant TIR1 family protein and the auxin analog and guides the target protein to be degraded, but preferably contains a full-length or partial protein of mAID as the Aux/IAA family protein.

"mAID" is the abbreviation of "mini-auxin-inducible degron" and is a protein composed of a partial sequence of the *Arabidopsis* IAA17, which is one of the Aux/IAA family proteins. This partial sequence is a sequence composed of a region containing at least two Lys residues at each of the N-terminal side and the C-terminal side of a domain II region of the Aux/IAA family protein or a sequence formed by linking two or more sequences described above. This mAID can become a degradation tag that labels the target protein. For example, the amino acid sequence of the mAID is represented by the sequence number 8.

<Third Nucleic Acid>

In a case where the target protein has been determined, the kit of the present invention may contain a third nucleic acid that encodes the target protein linked upstream or downstream of the second nucleic acid. The second nucleic acid may be disposed adjacent to any of the 5' side or 3' side of the third nucleic acid.

A fused nucleic acid composed of the second nucleic acid and the third nucleic acid, similar to the first nucleic acid, preferably has a promoter sequence operably linked thereto and may be combined into an expression vector.

<Fourth Nucleic Acid>

The first nucleic acid and the second nucleic acid or the fused nucleic acid composed of the second nucleic acid and the third nucleic acid may be each combined into an expression vector, but the kit of the present invention may contain a fourth nucleic acid that encodes a linker for controlling a plurality of genes with one promoter and that is linked between the first nucleic acid, and the second nucleic acid and the third nucleic acid.

As the fourth nucleic acid, a nucleic acid that encodes a read-through linker and a nucleic acid that encodes a non-read-through linker are exemplified.

As the nucleic acid that encodes a read-through linker, a nucleic acid that encodes a cut sequence by an endogenous enzyme is exemplified, and a nucleic acid that encodes a T2A peptide, a nucleic acid that encodes a P2A peptide, a nucleic acid that encodes a F2A peptide and a nucleic acid that encodes an E2A peptide are exemplified.

As the nucleic acid that encodes a non-read-through linker, IRES is exemplified.

<Transposon Vector>

The kit of the present invention may contain a transposon vector containing the first nucleic acid and/or the fused nucleic acid composed of the second nucleic acid and the third nucleic acid.

Specifically, the kit of the present invention preferably contains a vector containing transposon elements at both ends of the first nucleic acid and/or the fused nucleic acid to which the promotor sequence is operably linked and a vector containing a nucleic acid that encodes transposase.

The first nucleic acid and the fused nucleic acid may be each contained in a separate vector; however, in a case where both are contained in one vector, such a vector preferably contains the fourth nucleic acid.

For the transfer of a transposon, an enzyme that catalyzes a transposition reaction (transposase) and DNA that is recognized by this transposase and transferred (transposon element) are required. The kit of the present invention preferably contains such an enzyme and DNA.

In the kit of the present invention, in a case where DNA that encodes the transposase and the transposon element are linked together as transposon DNA and combined into one expression system, the transposon DNA is capable of expressing and transferring the transposase on its own once the transposon DNA is introduced into a cell.

Such an autonomous transposon is possibly transferred from a position to which the transposon has been transferred to another position. Therefore, in order to more stably introduce a target gene into a chromosome, the kit of the present invention preferably contains DNA that encodes the transposase and the transposon element that are each combined into a separate expression system.

The transposon is not particularly limited, and Sleeping Beauty, piggyBac, Tol 2 and the like are exemplified.

<Fifth Nucleic Acid>

The fused nucleic acid composed of the second nucleic acid and the third nucleic acid may be replaced by the endogenous third nucleic acid through homologous recombination; however, in a case where such a fused nucleic acid is combined into an arbitrary chromosome by the transposon or the like, the kit of the present invention preferably contains a target genome DNA cleavage enzyme that encodes an endogenous target protein or a fifth nucleic acid that encodes the above-described enzyme. As a system that is used for the double-strand break of a target genome DNA, a CRISPR-Cas9 system, a transcription activator-like effector nuclease (TALEN) system, a Zn finger nuclease system and the like are exemplified. A method for introducing these systems into a cell is not particularly limited, and the target genome DNA cleavage enzyme itself may be introduced into a cell or a target genome DNA cleavage enzyme expression vector containing the fifth nucleic acid may be introduced into a cell.

For example, in the CRISPR-Cas9 system, a method in which a Cas9 expression vector and an expression vector that encodes guide RNA that induces Cas9 in a site that is intended to be cut are introduced into a cell, a method in which an expressed and purified recombinant Cas9 protein and guide RNA are introduced into a cell, or the like is exemplified. The guide RNA may be divided into two parts of tracrRNA and crRNA or may be sgRNA that is connected to one.

<<Target Protein Degradation Method>>

A target protein degradation method of the present invention is a method in which the above-described kit of the present invention is used. The use of the above-described kit in the auxin-inducible degron system makes strict and full control of target protein degradation possible.

For example, as a method for controlling the degradation of a target protein using the above-described kit, the following method or the like is exemplified.

First, a target protein labeled with a degradation tag and a TIR1 family protein are expressed in a cell. The target protein labeled with a degradation tag and the TIR1 family protein are preferably expressed steadily.

Next, an auxin analog is added to a culture medium. The concentration of the auxin analog that is contained in the culture medium is not limited and is, for example, 1 μM or more and less than 0.1 mM and preferably 10 nM or more and 50 μM or less. As will be described below in examples, in a combination of the compound represented by the general formula (I) and OsTIR1(F74G), it is possible to sufficiently induce degradation of a target protein at a concentration of 50 nM. When a predetermined concentration of an auxin analog is added, a complex of a mutant TIR1 family protein and the auxin analog is formed, this complex recognizes the target protein labeled with a degradation tag, and degradation of the target protein is induced.

According to the degradation method of the present invention, it is possible to induce degradation of a target protein in an auxin analog-specific manner.

<<Compound>>

A compound of the present invention is a compound represented by the following general formula (II).

[Chem. 13]

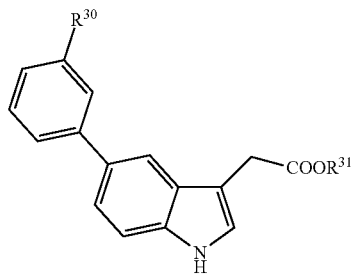

(II)

(In the general formula (II), $R^{30}$ represents a hydrogen atom, an alkyl group having 1 to 6 carbon atoms or a halogen atom and $R^{31}$ represents a hydrogen atom or an alkyl group having 1 to 6 carbon atoms. Here, in a case where $R^{30}$ is a hydrogen atom or an alkyl group having 1 to 6 carbon atoms, $R^{31}$ is an alkyl group having 1 to 6 carbon atoms.)

Examples of the halogen atom as $R^{30}$ include a fluorine atom, a chlorine atom, a bromine atom, an iodine atom and the like. Among them, a fluorine atom or a chlorine atom is preferable as the halogen atom.

Examples of the alkyl group as each of $R^{30}$ and $R^{31}$ independently include a methyl group, an ethyl group, an n-propyl group, an isopropyl group, a cyclopropyl group, an n-butyl group, an isobutyl group, a sec-butyl group, a tert-butyl group, a cyclobutyl group, an n-pentyl group, an isopentyl group, a sec-pentyl group, a neopentyl group, a tert-pentyl group, a cyclopentyl group, a 2,3-dimethylpropyl group, a 1-ethylpropyl group, a 1-methylbutyl group, a 2-methylbutyl group, an n-hexyl group, an isohexyl group, a cyclohexyl group, a 2-methylpentyl group, a 3-methylpentyl group, a 1,1,2-trimethylpropyl group, a 3,3-dimethylbutyl group and the like. Among them, as the alkyl group having 1 to 6 carbon atoms, a methyl group or an ethyl group is preferable.

As the compound represented by the general formula (II), compounds represented by the following formulae (II-1) to (II-4) are preferable.

[Chem. 14]

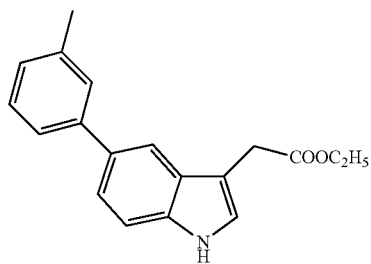

(II-1)

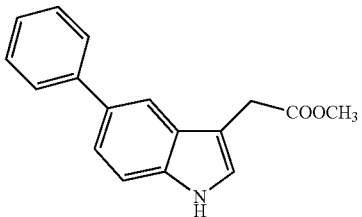

(II-2)

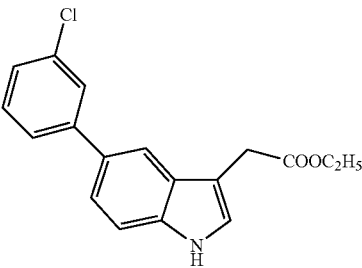

(II-3)

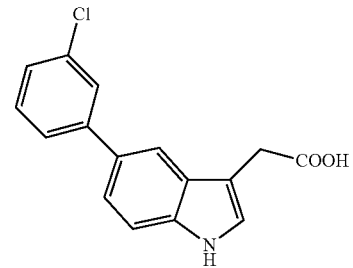

(II-4)

<<Cell>>

A cell of the present invention is a non-plant-derived eukaryotic cell that is used in auxin-inducible degron systems that control the degradation of target proteins and has a chromosome containing a first nucleic acid that encodes a mutant TIR1 family protein having a mutation at an auxin-binding site.

The cell of the present invention preferably has the first nucleic acid at a safe harbor site.

The cell is the same as that described in the <<Auxin-inducible degron system kit>> section and is not particularly limited as long as the cell is a non-plant-derived eukaryotic cell, and examples thereof include cells of animals, fungi, protists and the like.

The TIR1 family protein is the same as that described in the <<Auxin-inducible degron system kit>> section, and an OsTIR1 gene, which is a rice-derived TIR1 gene, is preferable.

The mutant TIR1 family protein is the same as that described in the <<Auxin-inducible degron system kit>> section, a protein in which the $74^{th}$ F of OsTIR1 has mutated into A, G or S is preferable, and a protein in which the $74^{th}$ F of OsTIR1 has mutated into G is more preferable.

Specifically, the mutant TIR1 family protein is the same as that described in the <<Auxin-inducible degron system kit>> section and particularly preferably a protein that is composed of sequences including any one of the above-described amino acid sequences (a) to (c) and is bound with the degradation tag through the complex with the auxin analog to guide the target protein to be degraded.

The cell of the present invention preferably further has a chromosome containing a second nucleic acid that encodes a degradation tag containing at least a part of an Aux/IAA family protein and having an affinity to the complex of the mutant TIR1 family protein and the auxin analog and a third nucleic acid that encodes the target protein linked upstream or downstream of the second nucleic acid.

A method for introducing the first nucleic acid, the second nucleic acid and the third nucleic acid into the chromosomes is not particularly limited, and, as described in the <<Auxin-inducible degron system kit>> section, the nucleic acids may be introduced using a genome-editing technology such as a CRISPR system or may be introduced using a transposon vector.

EXAMPLES

Hereinafter, the present invention will be described using examples, but the present invention is not limited to the following examples.

Example 1

1. Synthesis of Auxin Analog

A compound indicated by the formula (I-2) (also referred to as 5-Ph-IAA) was synthesized.

2. Preparation of Cell

An HCT116 cell (human colon adenocarcinoma-derived cell) having DNA in which an OsTIR1(WT) or OsTIR1 (F74G) and an mAID-EGFP (green fluorescent protein)-NLS (nuclear localization signal) were encoded through a P2A sequence inserted onto a chromosome by a transposon (hereinafter, referred to as "OsTIR1(WT)/mAID-EGFP-NLS expressing cell" or "OsTIR1(F74G)/mAID-EGFP-NLS expressing cell") was prepared (refer to FIG. 1).

3. Addition of Auxin Analog

The auxin analog (concentration in culture medium: 0, 200 μM) was added to the OsTIR1(F74G)/mAID-EGFP-NLS expressing cell and cultured for 24 hours. In addition, as a control, a cell containing an auxin added to the OsTIR1(WT)/mAID-EGFP-NLS expressing cell was also prepared.

3. FACS Analysis

After 24 hours from the addition of the auxin analog, the cells were collected, and FACS analysis was performed. The results are shown in FIG. 1.

FIG. 1 shows that, in the OsTIR1(F74G)/mAID-EGFP-NLS expressing cell to which the auxin analog was added, expression before degradation induction was high and uniform compared with the OsTIR1(WT)/mAID-EGFP-NLS expressing cell. Furthermore, in the OsTIR1(F74G)/mAID-EGFP-NLS expressing cell to which the auxin analog was added, degradation of GFP was observed more sharply compared with that in the OsTIR1(WT)/mAID-EGFP-NLS expressing cell to which an auxin was added.

Figure 7:
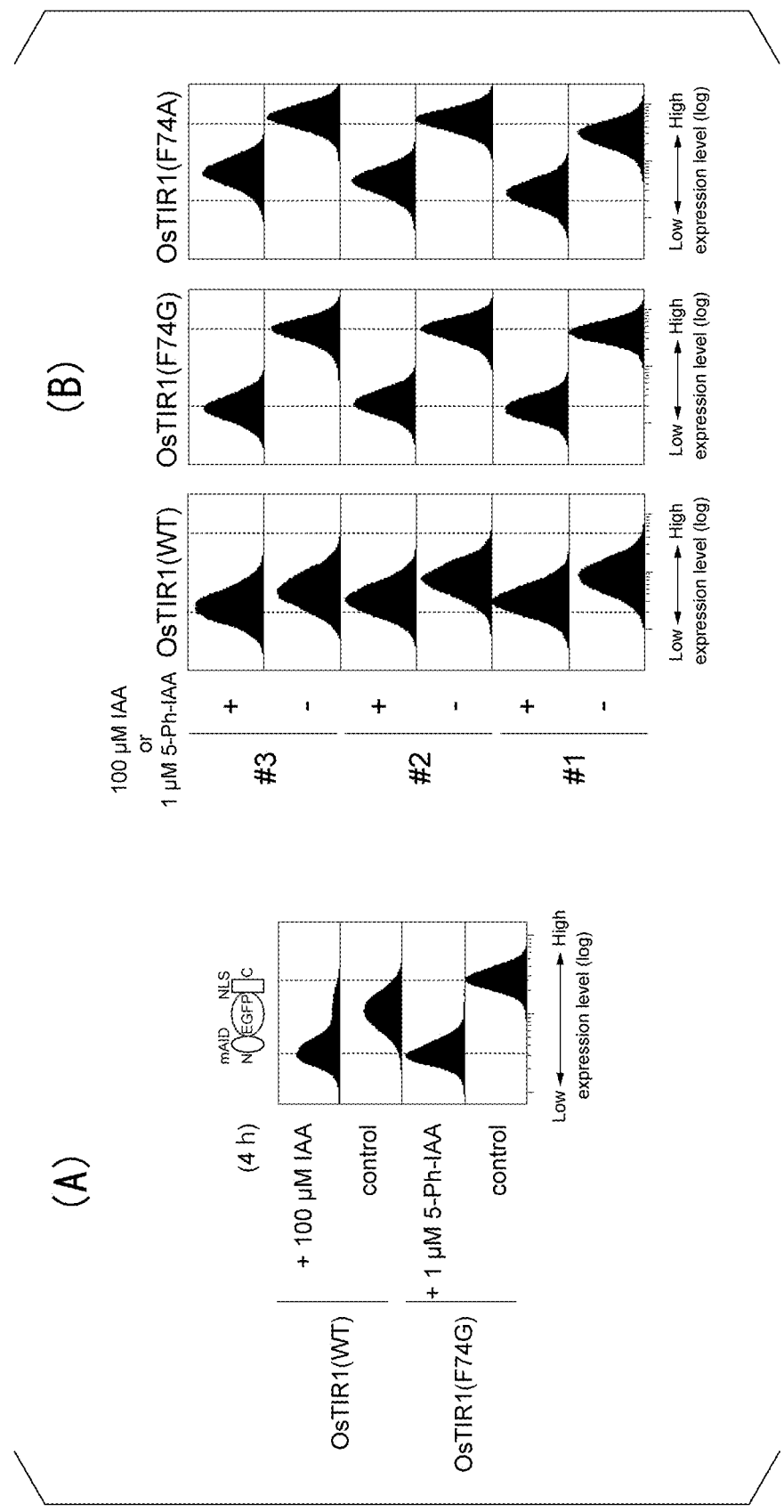
FIG. 7(A) shows the investigation results of degradation of a target protein in an OsTIR1(WT)/mAID-EGFP-NLS expressing cell and in an OsTIR1(F74G)/mAID-EGFP-NLS expressing cell.
FIG. 7(B) shows the FACS analysis results of degradation of a target protein in an OsTIR1(WT)/mAID-EGFP-NLS expressing cell, in an OsTIR1(F74G)/mAID-EGFP-NLS expressing cell and in an OsTIR1(F74A)/mAID-EGFP-NLS expressing cell.

Furthermore, the same experiment was performed by adding 100 μM of an auxin to the OsTIR1(WT)/mAID-EGFP-NLS expressing cell, adding 1 μM of 5-Ph-IAA to the OsTIR1(F74G)/mAID-EGFP-NLS expressing cell, collecting the cells after four hours, and performing FACS analysis. The results are shown in FIG. 7(A).

Comparison of OsTIR1(WT) and OsTIR1(F74G) in an isogenic background indicated that, in OsTIR1(WT) with no auxin added thereto, the mAID-EGFP-NLS reporter level was low, the signal peak was wide and basal degradation occurred. It was indicated that the addition of 100 μM of an auxin to OsTIR1(WT) shifted the signal peak to the left and the reporter was degraded.

In contrast, it was indicated that, in the cell expressing OsTIR1(F74G), the expression level of the mAID-EGFP-NLS reporter was high, the signal peak was sharper and, in this cell, basal degradation was low. Furthermore, the addition of 1 μM of 5-Ph-IAA for four hours caused the reporter to be efficiently degraded in the cell expressing OsTIR1 (F74G).

Furthermore, the same experiment was also performed on three clones using an OsTIR1(F74A)/mAID-EGFP-NLS expressing cell. The results are shown in FIG. 7(B).

As shown in FIG. 7(B), it was suggested that, in three cell lines expressing OsTIR1(WT), wider peaks were shown at low expression levels and basal degradation occurred even with no auxin.

On the other hand, it was suggested that, in clones expressing OsTIR1(F74G) and OsTIR1(F74A) with no 5-Ph-IAA added thereto, stronger expression levels of the reporter were shown and basal degradation was suppressed.

Furthermore, in the clones expressing OsTIR1(F74G), sharper degradation of the mAID-EGFP-NLS reporter was shown compared with the clone expressing OsTIR1(F74A) by a 5-Ph-IAA treatment. In all cases, it was shown that the signal peaks shifted to the left after the 5-Ph-IAA treatment and degradation was induced.

Figure 10:
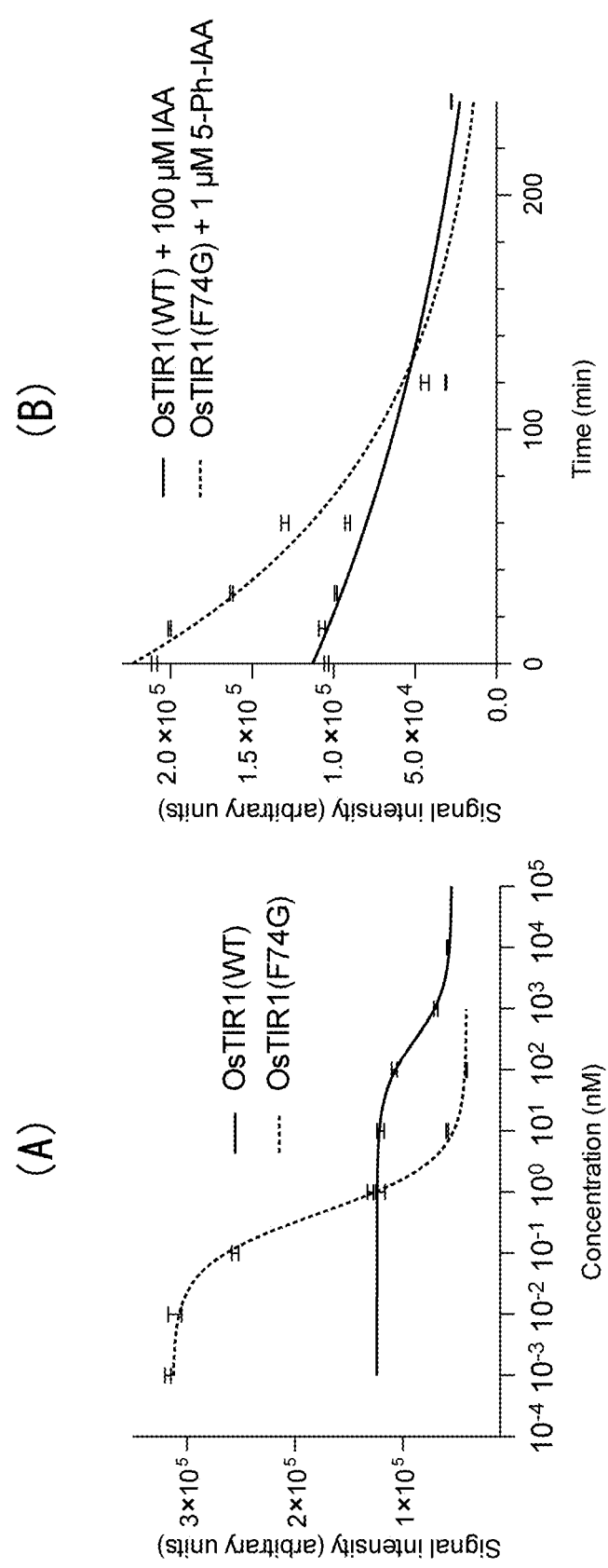
FIG. 10(A) is a graph showing the results of inducing degradation of an mAID-EGFP-NLS reporter using IAA (auxin) and 5-Ph-IAA in different doses, respectively, in OsTIR1(WT) and in OsTIR1(F74G).
FIG. 10(B) is a graph showing the results of inducing degradation of the reporter over time in OsTIR1(WT) and in OsTIR1(F74G).

In order to compare OsTIR1(WT) and OsTIR1(F74G) in more detail, the degradation of the mAID-EGFP-NLS reporter was induced using IAA (auxin) and 5-Ph-IAA in different doses, respectively (refer to FIG. 10(A)). As shown in FIG. 10(A), the ligand concentration necessary for the degradation of the cell expressing OsTIR1(F74G) was significantly low. DC 50 values (concentrations for 50% degradation) were 300±30 nM and 0.45±0.01 nM in OsTIR1 (WT) and OsTIR1(F74G), respectively, and it was confirmed that the system in which 5-Ph-IAA was used functioned at an approximately 670-times lower concentration compared with conventional auxin-inducible degron systems.

In order to investigate dynamics over time attributed to the removal of a target protein, samples after a lapse of time were taken, and the expression levels of the reporter were observed (refer to FIG. 10(B)). It was confirmed that the degradation system according to the present invention (also referred to as AID2 system) functioned significantly sharply with a half-life of 62.3±2.0 minutes compared with conventional systems.

On the other hand, in conventional systems, the efficiency decreased with a half-life of 147.1±12.5 minutes. It was confirmed that, in the AID2 system in which OsTIR1(F74G) was used, the basal degradation of a target protein was small, the concentration of 5-Ph-IAA, which was a new activating ligand, was significantly low, and the degradation rate of the target became fast.

Figure 11:
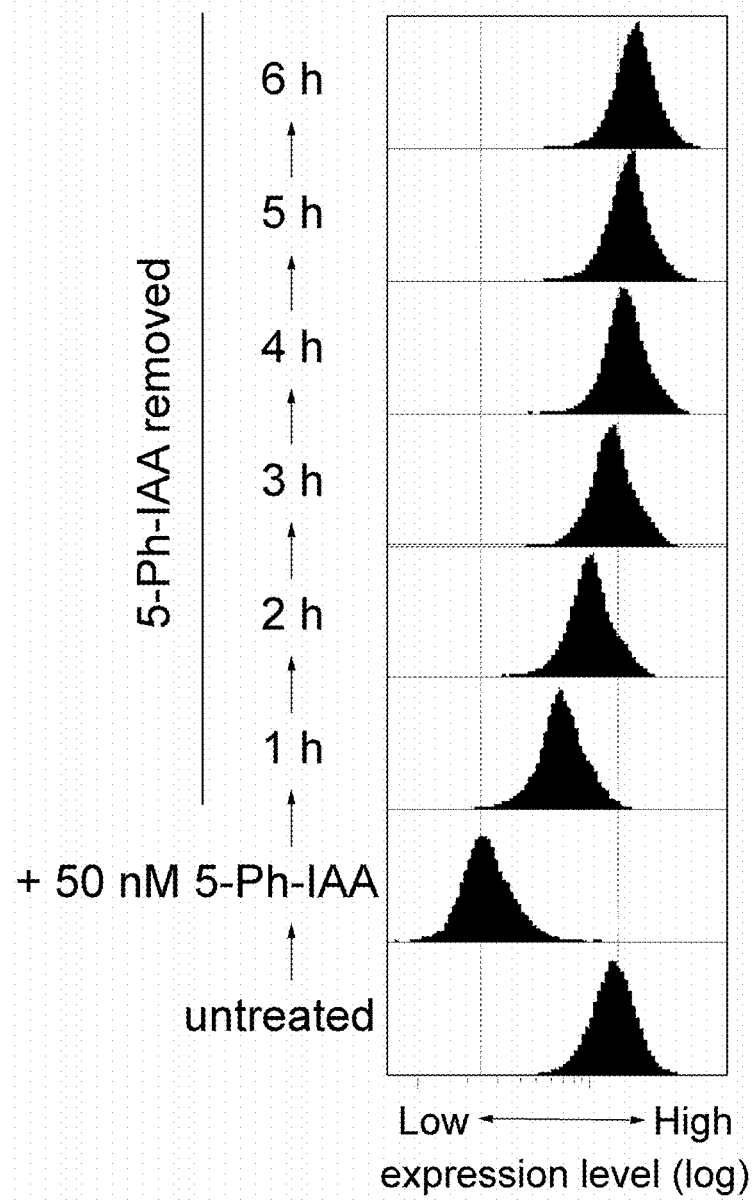
FIG. 11 shows the investigation results of recovery of mAID-EGFP-NLS expression after removal of 5-Ph-IAA in OsTIR1(F74G).

In order to confirm the reversibility of the AID2 system in which a pair of OsTIR1(F74G) and 5-Ph-IAA was used, the degradation of the mAID-EGFP-NLS reporter was induced, then, the culture medium was exchanged with a culture medium containing no 5-Ph-IAA, and the expression of the reporter was investigated. The results are shown in FIG. 11. As shown in FIG. 11, the expression of the reporter was fully recovered after three hours, and the reversibility of the AID2 system was shown.

Example 2

1. Synthesis of Auxin Analogs

A compound indicated by a formula (I-1-5) (also referred to as 5-Ph-IAA), a compound indicated by a formula (I-1-6) (also referred to as 5-(3,4-diMePh)-IAA), a compound indicated by a formula (I-1-7) (also referred to as 5-(3-MePh)-

IAA) and a compound indicated by a formula (I-1-8) (also referred to as 5-(3-ClPh)-IAA) were synthesized. The compound indicated by the formula (I-1-4) (also referred to as 5-(3-MeOPh)-IAA) was procured from Tokyo Chemical Industry Co., Ltd.

Hereinafter, a method for synthesizing the synthesized compounds will be described.

Synthesis of 5-bromoindole 3-acetic acid methyl ester

[Chem. 15]

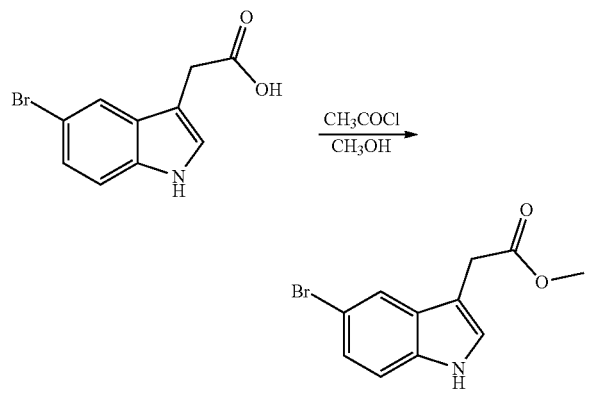

A methanol solution (25 mL) of 5-bromoindole 3-acetic acid (500 mg, 1.97 mmol) was fed into a 100 mL round-bottomed flask, and 1 mL of acetyl chloride was added dropwise thereto under stirring. A reaction was caused at room temperature for three hours. The reaction solution was poured into 100 mL of water, and this was extracted twice with 50 mL of ethyl acetate. An organic layer was washed with 100 mL of saturated salt water, then dehydrated with anhydrous sodium sulfate and condensed under reduced pressure, thereby obtaining 5-bromoindole 3-acetic acid methyl ester of a ginger oil (26 mg, 1.96 mmol, yield: 99%).

The analysis results of the obtained compound by $^1$H-NMR and $^{13}$C-NMR are shown below.

$^1$H-NMR (400 MHz, CDCl$_3$) δ 8.17 (s, 1H), 7.73 (d, J=1.8 Hz, 1H), 7.28 (dd, J=7.6, 5.7 Hz, 1H), 7.20 (dd, J=13.5, 4.8 Hz, 1H), 7.16-7.10 (m, 1H), 3.75-3.70 (m, 2H), 3.71 (s, 3H), $^{13}$C-NMR (100 MHz, CDCl$_3$) δ C, 172.33, 134.80, 129.06, 125.21, 124.42, 121.59, 113.12, 112.730, 108.24, 52.18, 30.98.

Synthesis of 5-phenyl-indole-3-acetic acid methyl ester

[Chem. 16]

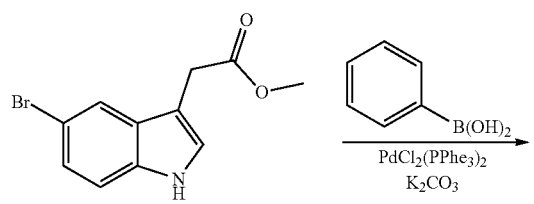

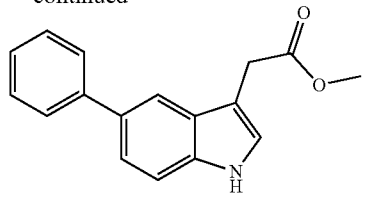

5-Bromoindole 3-acetic acid methyl ester (540 mg, 2.01 mmol), phenylboronic acid (467 mg, 3.83 mmol) and bis(triphenylphosphine)palladium (II) dichloride [PdCl$_2$(PPhe$_3$)$_2$: 67 mg, 0.095 mmol] were added to a 50 mL round-bottomed flask containing 5 mL of dimethylformamide, 5 mL of ethanol and 2 mL of a 3M potassium carbonate aqueous solution. The inside of the container was substituted with nitrogen, and the components were heated and refluxed at 120° C. for five hours. 10 mL of ethyl acetate and 20 mL of water were added to the reaction solution, and the reaction solution was extracted three times with 15 mL of ethyl acetate. An organic layer was washed with 20 mL of saturated salt water, subsequently, dehydrated with anhydrous sodium sulfate and then condensed under reduced pressure. This concentrate was purified by silica gel column chromatography (eluting solution, hexane:ethyl acetate=3:1), and 5-phenyl-indole 3-acetic acid methyl ester was obtained as an orange oil (134 mg, 0.50 mmol, yield: 25.1%)

The analysis results of the obtained compound by $^1$H-NMR and $^{13}$C-NMR are shown below.

$^1$H-NMR (400 MHz, CDCl$_3$) δ 8.14 (s, 1H), 7.82 (s, 1H), 7.69-7.61 (m, 2H), 7.43 (t, J=7.8 Hz, 3H), 7.40-7.34 (m, 1H), 7.34-7.28 (m, 1H), 7.16 (d, J=10.1 Hz, 1H), 4.17 (qd, J=7.1, 4.0 Hz, 2H), 3.81 (s, 3H), $^{13}$C-NMR (100 MHz, CDCl$_3$) δC 172.19, 142.64, 135.74, 133.37, 128.74, 127.52, 126.44, 123.88, 122.18, 117.53, 111.52, 109.04, 60.95, 31.50.

Synthesis of 5-phenyl-indole-3-acetic acid methyl ester (Compound Indicated by Formula (I-1-5) (Also Referred to as 5-pH-IAA))

[Chem. 17]

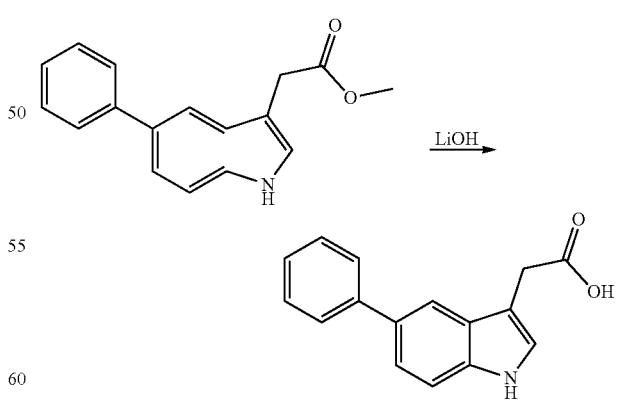

5-Phenyl-indole-3-acetic acid methyl ester (124 mg, 0.47 mmol) was placed in a 10 mL round-bottomed flask, and 1 mL of methanol and 1 mL of tetrahydrofuran were added thereto. A lithium hydroxide aqueous solution (23 mg, 0.96 mmol dissolved in 1 mL of water) was added dropwise to this. This reaction solution was stirred at room temperature for two hours to be hydrolyzed. 5 mL of 1M dilute hydrochloric acid and 5 mL of ethyl acetate were added to the reaction solution to extract a product into an ethyl acetate layer. Furthermore, the product was extracted three times with 5 mL of ethyl acetate. This organic layer was washed with 10 mL of saturated salt water, then dehydrated by adding anhydrous sodium sulfate thereto and condensed under reduced pressure. The concentrate was purified by silica gel column chromatography (chloroform:acetone=95:5), and 5-phenyl-indole 3-acetic acid was obtained as a caramel powder (98 mg, 0.39 mmol, yield: 83.4%).

The analysis results of the obtained compound by $^1$H-NMR and $^{13}$C-NMR are shown below.

$^1$H-NMR (400 MHz, acetone-$d_6$) δ 10.61 (s, 1H), 10.17 (s, 1H), 7.89 (s, 1H), 7.68-7.65 (m, 2H), 7.48-7.46 (m, 1H), 7.44-7.40 (m, 3H), 7.34 (d, J=2.3 Hz, 1H), 7.26 (tt, J=7.3, 1.4 Hz, 1H), 3.82 (s, 2H), $^{13}$C-NMR (100 MHz, acetone-$d_6$) δ 173.20, 143.65, 137.15, 133.06, 129.51, 129.15, 127.86, 126.96, 125.39, 121.85, 118.07, 112.54, 109.65, 31.39

Synthesis of 5-phenyl-indole-3-acetic acid methyl ester

[Chem. 18]

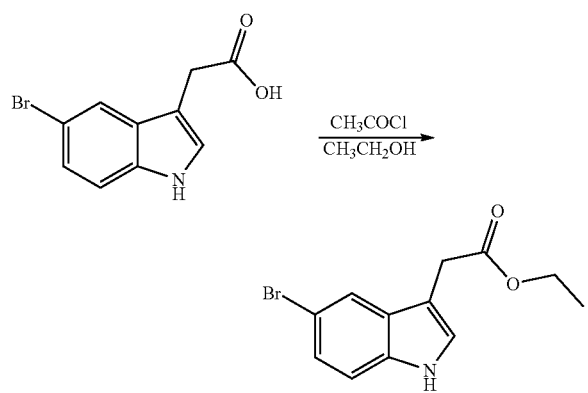

An ethanol solution (25 mL) of 5-bromoindole 3-acetic acid (508 mg, 2.00 mmol) was fed into a 100 mL round-bottomed flask, and 1 mL of acetyl chloride was added dropwise to this under stirring. This reaction solution was stirred at room temperature for three hours. The reaction solution was poured into 100 mL of water, and this was extracted twice with 50 mL of ethyl acetate. An organic layer was washed with 100 mL of saturated salt water, then dehydrated with anhydrous sodium sulfate and condensed under reduced pressure, thereby obtaining 5-bromoindole 3-acetic acid ethyl ester of a ginger oil (556 mg, 1.97 mmol, yield: 99%).

The analysis results of the obtained compound by $^1$H-NMR and $^{13}$C-NMR are shown below.

$^1$H-NMR (400 MHz, CDCl$_3$) δ 8.23 (s, 1H), 7.73 (s, 1H), 7.24 (dd, J=8.5, 2.1 Hz, 1H), 7.15 (d, J=8.7 Hz, 1H), 7.07 (s, 1H), 4.18 (q, J=7.2 Hz, 2H), 3.71 (s, 2H), 1.28 (t, J=7.3 Hz, 3H), $^{13}$C-NMR (100 MHz, CDCl$_3$) δ 172.07, 134.82, 129.05, 125.08, 124.49, 121.64, 112.99, 112.77, 108.21, 61.11, 31.31, 14.32.

Synthesis of 5-(3-methylphenyl)-indole-3-acetic acid ethyl ester

[Chem. 19]

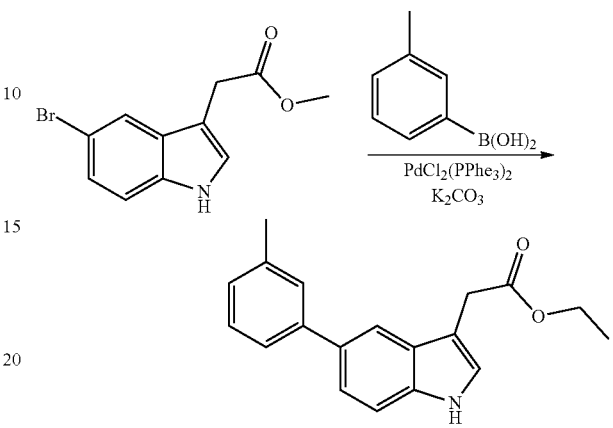

5-Bromoindole 3-acetic acid methyl ester (112 mg, 0.40 mmol), 3-methylphenylboronic acid (107 mg, 0.79 mmol) and bis(triphenylphosphine)palladium (II) dichloride (PdCl$_2$(PPhe$_3$)$_2$: 15 mg, 0.02 mmol) were added to a 50 mL round-bottomed flask containing 1 mL of dimethylformamide, 1 mL of ethanol and 0.5 mL of a 3M potassium carbonate aqueous solution. The inside of the container was substituted with nitrogen, and the components were heated and refluxed at 120° C. for five hours. 10 mL of ethyl acetate and 20 mL of water were added to the reaction solution, and the reaction solution was extracted three times with 15 mL of ethyl acetate. An organic layer was washed with 20 mL of saturated salt water, subsequently, dehydrated with anhydrous sodium sulfate and then condensed under reduced pressure. This concentrate was purified by silica gel column chromatography (eluting solution, hexane:ethyl acetate=3:1), and 5-(3-methylphenyl)-indole 3-acetic acid ethyl ester was obtained as a yellow oil (17 mg, 0.058 mmol, yield: 14.6%).

The analysis results of the obtained compound by $^1$H-NMR and $^{13}$C-NMR are shown below.

$^1$H-NMR (400 MHz, CDCl$_3$) δ 8.10 (s, 1H), 7.81 (s, 1H), 7.49-7.42 (m, 3H), 7.39 (d, J=8.2 Hz, 1H), 7.32 (t, J=7.8, 1H), 7.19 (d, J=1.1 Hz, 1H), 7.16-7.11 (m, 1H), 4.18 (q, J=7.6, 2H), 3.82 (s, 2H), 2.41 (s, 3H), 1.27 (t, J=7.1 Hz, 3H), $^{13}$C-NMR (100 MHz, CDCl$_3$) δC 172.12, 142.59, 138.23, 135.68, 133.51, 128.62, 128.32, 127.84, 127.19, 124.61, 123.74, 122.24, 117.51, 111.39, 109.13, 60.91, 31.49, 21.67, 14.34.

Synthesis of 5-(3-methylphenyl)-indole-3-acetic acid

[Chem. 20]

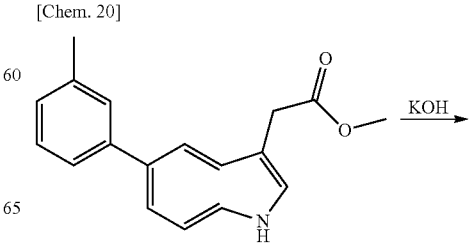

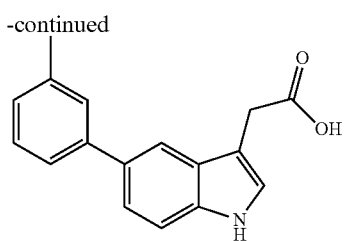

5-(3-Methylphenyl)-indole-3-acetic acid ethyl ester (40 mg, 0.14 mmol) was placed in a 5 mL glass vial, and 0.25 mL of methanol and 0.25 mL of tetrahydrofuran were added thereto. 0.25 mL of a 10% (W/V) potassium hydroxide aqueous solution was added dropwise to this. This reaction solution was stirred at room temperature for two hours to be hydrolyzed. 1 mL of 1M dilute hydrochloric acid and 2 mL of ethyl acetate were added to the reaction solution, and the reaction solution was extracted. Furthermore, the reaction solution was extracted three times with 2 mL of ethyl acetate. This organic layer was washed with 1 mL of saturated salt water, then dehydrated by adding anhydrous sodium sulfate thereto and condensed under reduced pressure. The concentrate was purified by silica gel column chromatography (chloroform:acetone=95:5), and 5-(3-methylphenyl)-indole 3-acetic acid was obtained as a caramel powder (29 mg, 0.11 mmol, yield: 80.2%). The analysis results of the obtained compound by $^1$H-NMR and $^{13}$C-NMR are shown below.

$^1$H-NMR (400 MHz, CDCl$_3$) δ 8.05 (s, 1H), 7.77 (d, J=1.4 Hz, 1H), 7.48-7.40 (m, 3H), 7.36 (d, J=8.7 Hz, 1H), 7.30 (t, J=7.3 Hz, 1H), 7.16-7.09 (m, 2H), 3.82 (s, 2H), 2.41 (s, 3H), $^{13}$C-NMR (100 MHz, CDCl$_3$) δC 177.84, 142.51, 138.29, 135.63, 133.70, 128.67, 128.36, 127.69, 127.27, 124.68, 124.04, 122.41, 117.34, 111.53, 108.22, 31.07, 21.68.

Synthesis of 5-(3,4-dimethylphenyl)-indole-3-acetic acid ethyl ester

[Chem. 21]

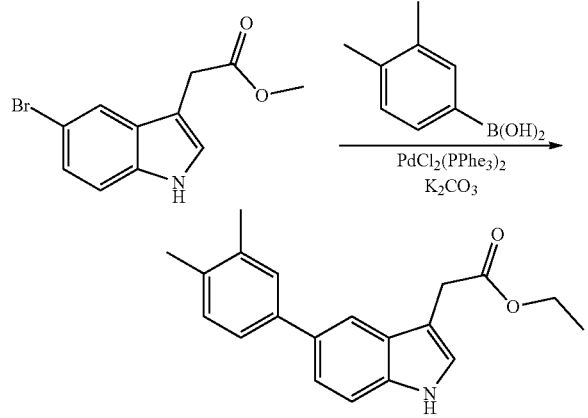

5-Bromoindole 3-acetic acid methyl ester (113 mg, 0.40 mmol), 3,4-dimethylphenylboronic acid (120 mg, 0.80 mmol) and bis(triphenylphosphine)palladium (II) dichloride (PdCl$_2$(PPhe$_3$)$_2$: 15 mg, 0.02 mmol) were added to a 50 mL round-bottomed flask containing 1 mL of dimethylformamide, 1 mL of ethanol and 0.5 mL of a 3M potassium carbonate aqueous solution. The inside of the container was substituted with nitrogen, and the components were heated and refluxed at 120° C. for five hours. 10 mL of ethyl acetate and 20 mL of water were added to the reaction solution, and the reaction solution was extracted three times with 15 mL of ethyl acetate. An organic layer was washed with 20 mL of saturated salt water, subsequently, dehydrated with anhydrous sodium sulfate and then condensed under reduced pressure. This concentrate was purified by silica gel column chromatography (eluting solution, hexane:ethyl acetate=3:1), and 5-(3,4-dimethylphenyl)-indole 3-acetic acid ethyl ester was obtained as a yellow oil (36 mg, 0.12 mmol, yield: 29.2%).

The analysis results of the obtained compound by $^1$H-NMR and $^{13}$C-NMR are shown below.

$^1$H-NMR (400 MHz, CDCl$_3$) δ 8.10 (s, 1H), 7.79 (d, J=0.9 Hz, 1H), 7.44 (m, 2H), 7.38 (m, 2H), 7.22-7.14 (m, 2H), 4.17 (q, J=7.0 Hz, 2H), 3.80 (s, 2H), 2.35 (s, 3H), 2.31 (s, 3H), 1.25 (t, J=7.0 Hz, 3H), $^{13}$C-NMR (100 MHz CDCl$_3$) δC 172.17, 140.24, 136.80, 135.55, 134.75, 133.44, 130.30, 128.80, 127.83, 124.85, 123.70, 122.15, 117.23, 111.37, 109.04, 60.89, 31.49, 20.04, 19.46, 14.35

Synthesis of 5-(3,4-dimethylphenyl)-indole-3-acetic acid

[Chem. 22]

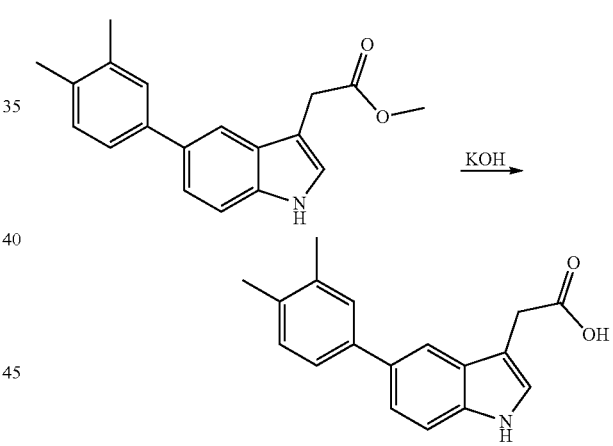

5-(3,4-Dimethylphenyl)-indole-3-acetic acid ethyl ester (30 mg, 0.098 mmol) was placed in a 5 mL glass vial, and 0.25 mL of methanol and 0.25 mL of tetrahydrofuran were added thereto. 0.25 mL of a 10% (W/V) potassium hydroxide aqueous solution was added dropwise to this. This reaction solution was stirred at room temperature for two hours to be hydrolyzed. 1 mL of 1M dilute hydrochloric acid and 2 mL of ethyl acetate were added to the reaction solution, and the reaction solution was extracted. Furthermore, the reaction solution was extracted three times with 2 mL of ethyl acetate. This organic layer was washed with 1 mL of saturated salt water, then dehydrated by adding anhydrous sodium sulfate thereto and condensed under reduced pressure. The concentrate was purified by silica gel column chromatography (chloroform:acetone=95:5), and 5-(3,4-dimethylphenyl)-indole 3-acetic acid was obtained as a caramel powder (20 mg, 0.0716 mmol, yield: 73.4%).

The analysis results of the obtained compound by $^1$H-NMR and $^{13}$C-NMR are shown below.

$^1$H-NMR (400 MHz, CDCl$_3$) δ 8.06 (s, 1H), 7.76 (s, 1H), 7.46-7.40 (m, 2H), 7.37 (d, J=8.2 Hz, 2H), 7.22-7.14 (m, 2H), 3.84 (s, 2H), 2.33 (s, 3H), 2.30 (s, 3H), $^{13}$C-NMR (100 MHz, CDCl$_3$) δC 177.32, 140.13, 136.83, 135.50, 134.83, 133.67, 130.05, 128.83, 127.69, 124.89, 123.91, 122.34, 117.10, 111.45, 108.23, 30.99, 20.03, 19.46.

Synthesis of 5-(3-chlorophenyl)-indole-3-acetic acid ethyl ester

[Chem. 23]

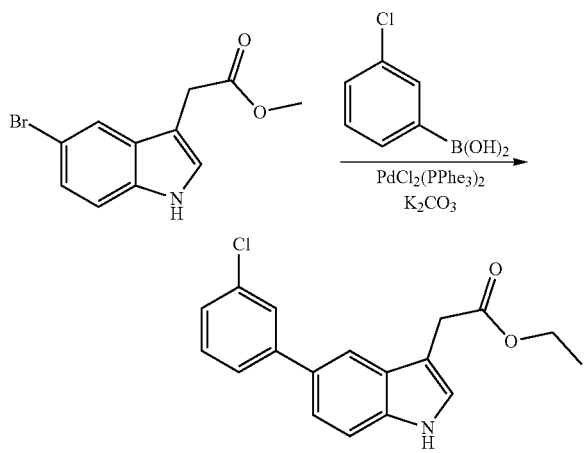

5-Bromoindole 3-acetic acid methyl ester (113 mg, 0.40 mmol), 3-chlorophenylboronic acid (128 mg, 0.82 mmol) and bis(triphenylphosphine)palladium (II) dichloride (PdCl$_2$(PPhe$_3$)$_2$: 15 mg, 0.02 mmol) were added to a 50 mL round-bottomed flask containing 1 mL of dimethylformamide, 1 mL of ethanol and 0.5 mL of a 3M potassium carbonate aqueous solution. The inside of the container was substituted with nitrogen, and the components were heated and refluxed at 120° C. for five hours. 10 mL of ethyl acetate and 20 mL of water were added to the reaction solution, and the reaction solution was extracted three times with 15 mL of ethyl acetate. An organic layer was washed with 20 mL of saturated salt water, subsequently, dehydrated with anhydrous sodium sulfate and then condensed under reduced pressure. This concentrate was purified by silica gel column chromatography (eluting solution, hexane:ethyl acetate=3:1), and 5-(3-chlorophenyl)-indole 3-acetic acid ethyl ester was obtained as a yellow oil (25 mg, 0.79 mmol, yield: 19.5%).

The analysis results of the obtained compound by $^1$H-NMR and $^{13}$C-NMR are shown below.

$^1$H-NMR (400 MHz, CDCl$_3$) δ 8.14 (s, 1H), 7.80 (s, 1H), 7.63 (t, J=1.8 Hz, 1H), 7.53 (dt, J=8.0, 1.4 Hz, 1H), 7.42 (d, J=1.4 Hz, 2H), 7.36 (t, J=8.0 Hz, 1H), 7.30-7.24 (m, 1H), 7.23 (d, J=2.3 Hz, 1H), 4.18 (q, J=7.2 Hz, 2H), 3.81 (s, 2H), 1.27 (t, 7.2 Hz, 3H), $^{13}$C-NMR (100 MHz, CDCl$_3$) δC 171.99, 144.48, 135.96, 134.54, 131.96, 129.90, 127.98, 127.52, 126.38, 125.59, 123.99, 121.98, 117.68, 111.61, 109.29, 60.95, 31.45, 14.34.

Synthesis of 5-(3-chlorophenyl)-indole-3-acetic acid (Compound Indicated by Formula (I-1-8) (Also Referred to as 5-(3-ClPh)-IAA))

[Chem. 24]

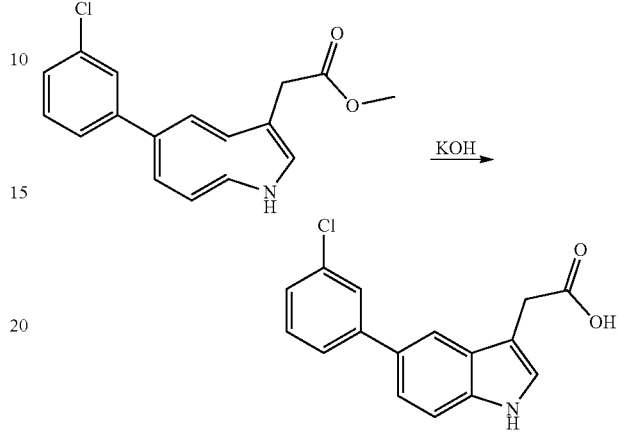

5-(3-Chlorophenyl)-indole-3-acetic acid ethyl ester (38 mg, 0.12 mmol) was placed in a 5 mL glass vial, and 0.25 mL of methanol and 0.25 mL of tetrahydrofuran were added thereto. 0.25 mL of a 10% (W/V) potassium hydroxide aqueous solution was added dropwise to this. This reaction solution was stirred at room temperature for two hours to be hydrolyzed. 1 mL of 1M dilute hydrochloric acid and 2 mL of ethyl acetate were added to the reaction solution, and the reaction solution was extracted. Furthermore, the reaction solution was extracted three times with 2 mL of ethyl acetate. This organic layer was washed with 1 mL of saturated salt water, then dehydrated by adding anhydrous sodium sulfate thereto and condensed under reduced pressure. The concentrate was purified by silica gel column chromatography (chloroform:acetone 95:5), and 5-(3-chlorophenyl)-indole 3-acetic acid was obtained as a caramel powder (31 mg, 0.11 mmol, yield: 89.6%).

The analysis results of the obtained compound by $^1$H-NMR and $^{13}$C-NMR are shown below.

$^1$H-NMR (400 MHz, CDCl$_3$) δ 8.13 (s, 1H), 7.76 (s, 1H), 7.61 (t, J=1.8 Hz, 1H), 7.49 (dt, J=7.8, 1.4 Hz, 1H), 7.40 (s, 2H), 7.34 (t, J=7.8 Hz, 1H), 7.26-7.28 (m, 1H), 7.20 (d, J=2.3 Hz, 1H), 3.82 (s, 2H), $^{13}$C-NMR (100 MHz, CDCl$_3$) δC 177.42, 144.36, 135.92, 134.54, 132.15, 129.94, 127.74, 127.54, 126.45, 125.66, 124.26, 122.15, 117.51, 111.73, 108.39, 30.98.

2. Preparation of Cell

An HCT116 cell (human colon adenocarcinoma-derived cell) in which a plasmid containing an OsTIR1(WT) gene or OsTIR1(F74G) gene was introduced and an mAID-EGFP (green fluorescent protein)-NLS (nuclear localization signal) gene was inserted onto a chromosome (hereinafter, referred to as "OsTIR1(WT)/mAID-EGFP-NLS expressing cell" or "OsTIR1(F74G)/mAID-EGFP-NLS expressing cell") was prepared (refer to FIG. 1).

3. Addition of Auxin Analog

The auxin analog (concentration in culture medium: 0, 50 nM, 100 nM, 500 nM or 1 μM) was added to the OsTIR1 (F74G)/mAID-EGFP-NLS expressing cell and cultured for 24 hours. In addition, as a control, a cell containing an auxin added to the OsTIR1(WT)/mAID-EGFP-NLS expressing cell was also prepared.

4. FACS Analysis

Figure 2:
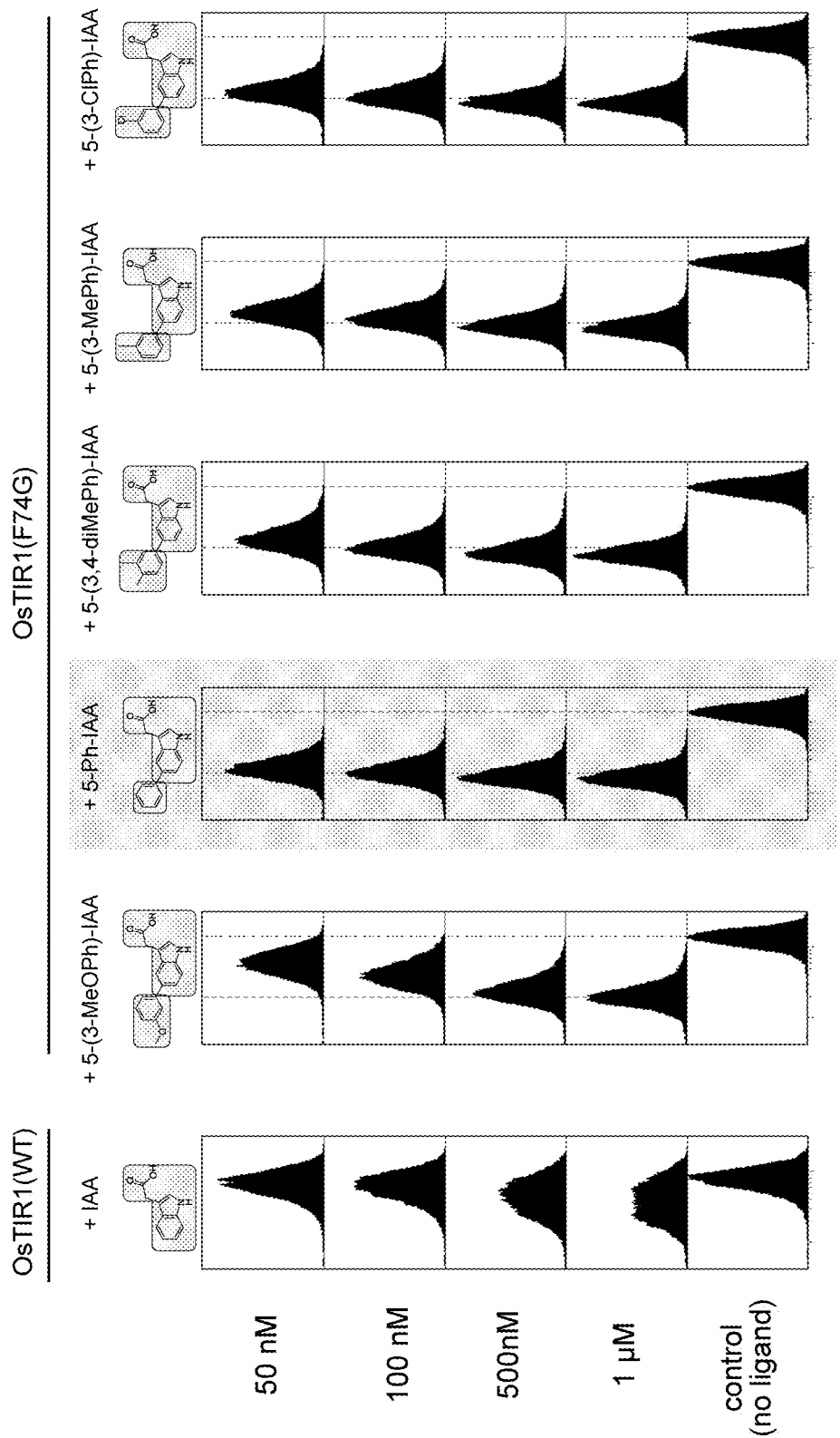
FIG. 2 shows the investigation results of degradation of a target protein in an OsTIR1(F74G)/mAID-EGFP-NLS expressing cell by addition of a plurality of types of auxin analogs in Example 2.

After 24 hours from the addition of each auxin analog, the cell was collected, and FACS analysis was performed. The results are shown in FIG. 2. In FIG. 2, "control" indicates cells to which only DMSO as an auxin analog solvent was added.

In the OsTIR1(F74G)/mAID-EGFP-NLS expressing cells to which the auxin analog was added, the degradation of GFP was observed at low concentrations from FIG. 2 compared with the OsTIR1(WT)/mAID-EGFP-NLS expressing cells to which an auxin was added.

Figure 8:
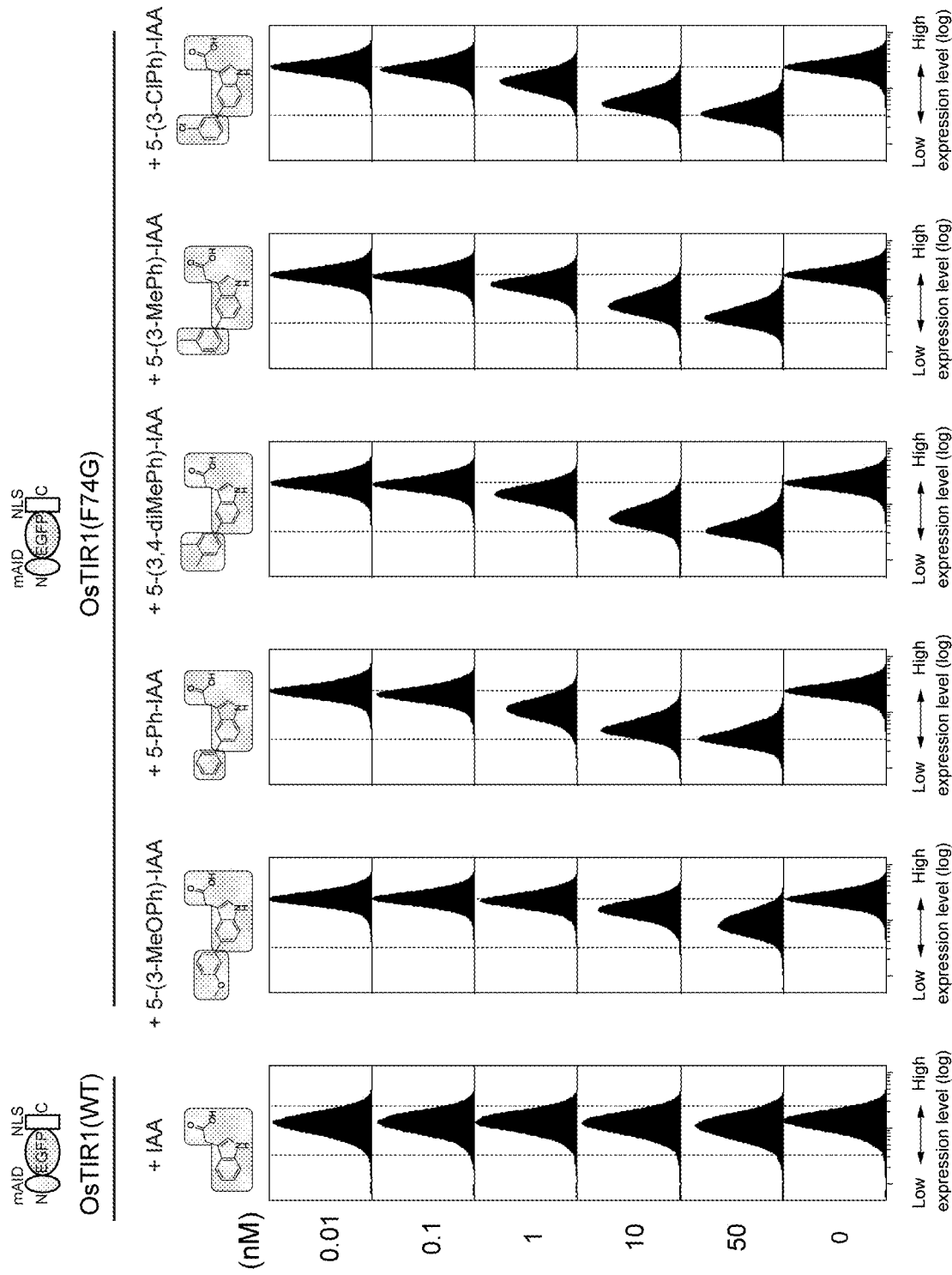
FIG. 8 shows the FACS analysis results of degradation of a target protein in an OsTIR1(F74G)/mAID-EGFP-NLS expressing cell by addition of a plurality of types of auxin analogs.

Furthermore, the OsTIR1(F74G)/mAID-EGFP-NLS expressing cell was treated with a low concentration of each auxin analog. The results are shown in FIG. 8. Among the auxin analogs used, 5-Ph-IAA showed a stronger effect of inducing the degradation of the mAID-EGFP-NLS reporter than the other compounds at 1 nM and 10 nM.

Figure 9:
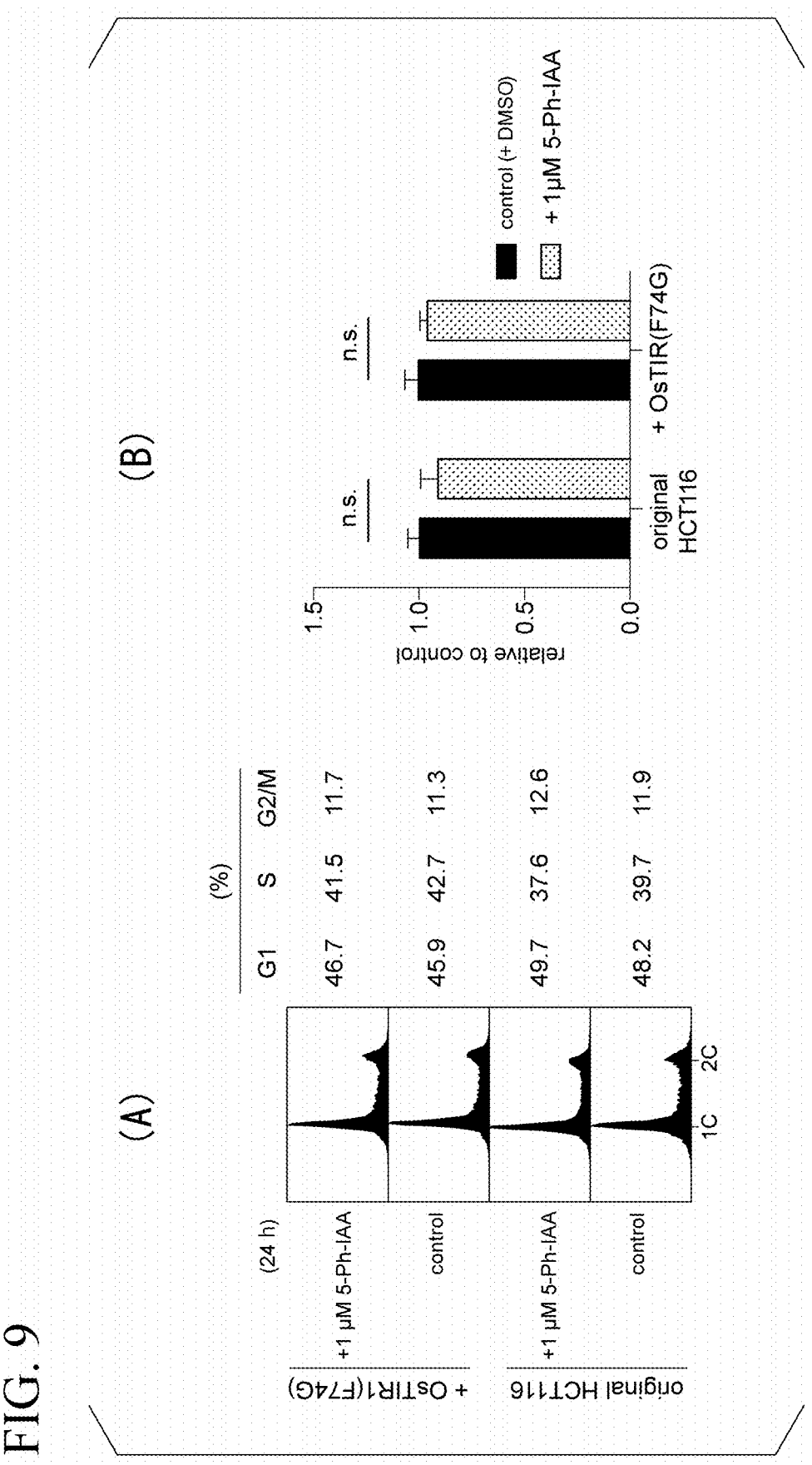
FIG. 9(A) shows the investigation results of an influence on the cell cycle of an HCT116 cell treated with 1 μM of 5-Ph-IAA.
FIG. 9(B) shows the investigation results of an influence on the colony formation efficiency of the HCT116 cell treated with 1 μM of 5-Ph-IAA.

As shown in FIG. 9(A) in which the influence of the treatment with 1 μM of 5-Ph-IAA on the HCT116 cell was investigated, no influence was shown on the cell cycle. As shown in FIG. 9(B), no change in the colony formation efficiency was shown. It was confirmed that 5-Ph-IAA is an effective ligand and has no toxicity at 1 μM.

Example 3

1. Preparation of Cell

In the HCT116 cell, an OsTIR1(WT) gene or OsTIR1 (F74G) gene was introduced into an AAVS1 gene locus, which is a safe harbor site, using a CRISPR/Cas system, and an OsTIR1(WT)-expressing HCT116 cell or OsTIR1 (F74G)-expressing HCT116 cell was constructed.

2. Colony Formation Test

A plasmid vector having mAID, clover and a neomycin resistance gene and having a homologous sequence with respect to a DHC1 gene so as to sandwich mAID and the neomycin resistance gene was introduced into the OsTIR1 (WT)-expressing HCT116 cell or OsTIR1(F74G)-expressing HCT116 cell using a CRISPR/Cas9 system, and homologous recombination with the endogenous DHC1 gene was performed. Next, after selection by G418, the formed colony was dyed using crystal violet. "DHC1" is the abbreviation for dynein heavy chain 1. The results are shown in FIG. 3.

Figure 3:
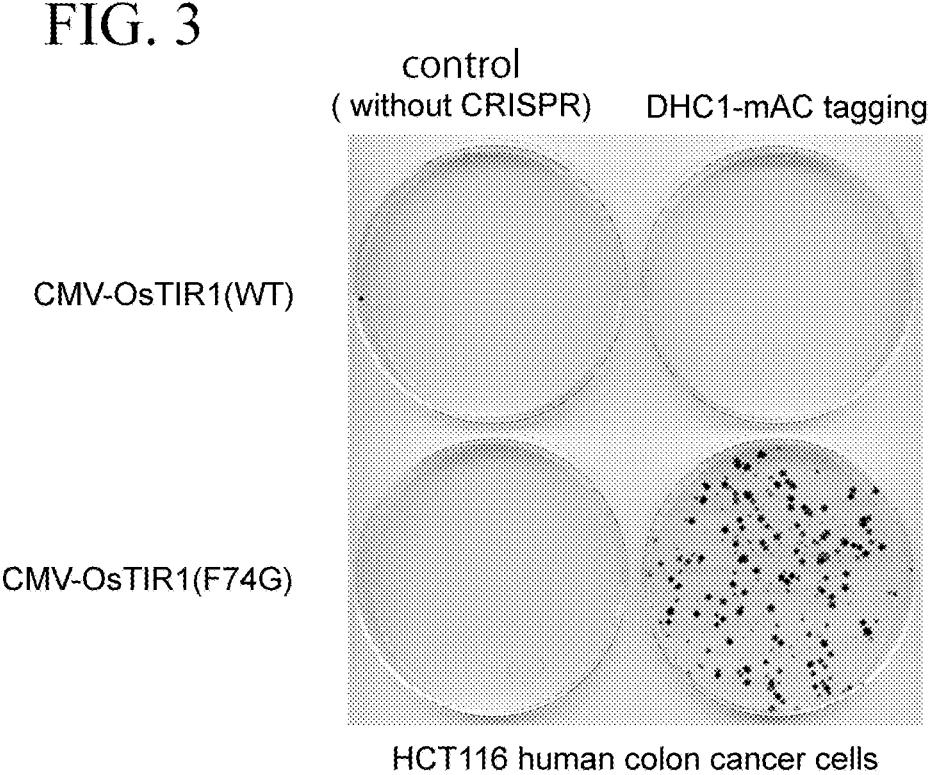
FIG. 3 shows the results of a colony formation test in Example 3.

The colony formation was not confirmed from FIG. 3 since no resistance gene works without CRISPR. In the OsTIR1(WT)-expressing HCT116 cell, the colony formation was not confirmed probably because auxin-independent degradation induction occurred even in the homologous recombinant cell. On the other hand, in the OsTIR1(F74G)-expressing HCT116 cell, the colony formation was confirmed in the homologous recombinant cell.

3. Degradation Induction Test

A degradation induction test of DHC1 was performed using the HCT116 cell expressing OsTIR1(F74G) on which homologous recombination had been performed in the above-described section 2 (hereinafter, referred to as "OsTIR1(F74G)/DHC1-mAID-Clover expressing cell").

Figure 4:
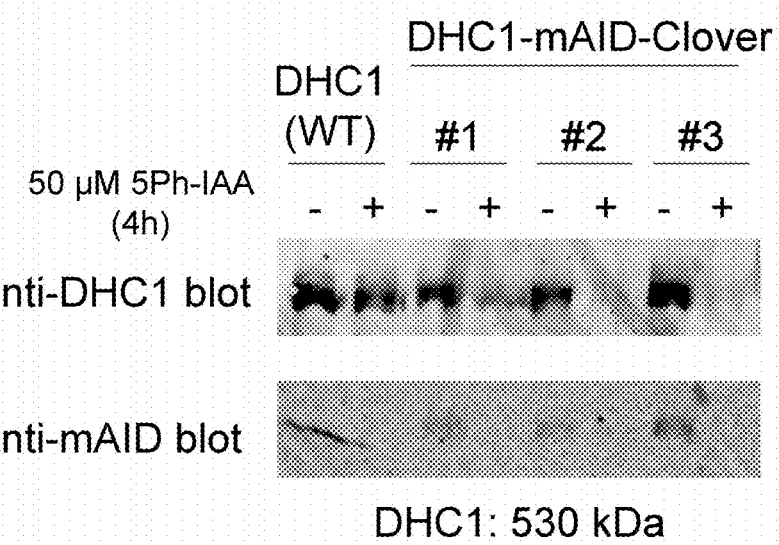
FIG. 4(A) shows microscopic images of an OsTIR1(F74G)/DHC1-mAID-Clover expressing cell to which 5-Ph-IAA is added.
FIG. 4(B) is the confirmation results of 5-Ph-IAA-dependent DHC1 degradation by Western blotting.

The compound indicated by the formula (I-2) (also referred to as 5-Ph-IAA) was added to the OsTIR1(F74G)/ DHC1-mAID-Clover expressing cell, and the appearance of the cell after 24 hours was observed (FIG. 4(A)).

As shown in FIG. 4(A), the addition of 5-Ph-IAA degraded a DHC1-mAID-Clover fused protein, whereby accumulation of cells in the mitotic period was observed.

Furthermore, the degradation of DHC1 was confirmed by Western blotting (FIG. 4(B)). As shown in FIG. 4(B), in all of the clones #1 to #3 generated by homologous recombination, the degradation of DHC1 and mAID was confirmed in a 5-Ph-IAA-dependent manner.

Example 4

In constructing an endogenous target protein degradation system, there are three difficulties described below. (1) Since a number of cultured cells become polyploids, the allele of a target protein has two or more copies. Therefore, it is difficult to construct this degradation system in a variety of cultured cell lines. (2) There is a need to establish a parent strain into which OsTIR1(F74G) has been introduced in advance. (3) It takes time and effort to construct a library of a number of degradation systems.

Figure 5:
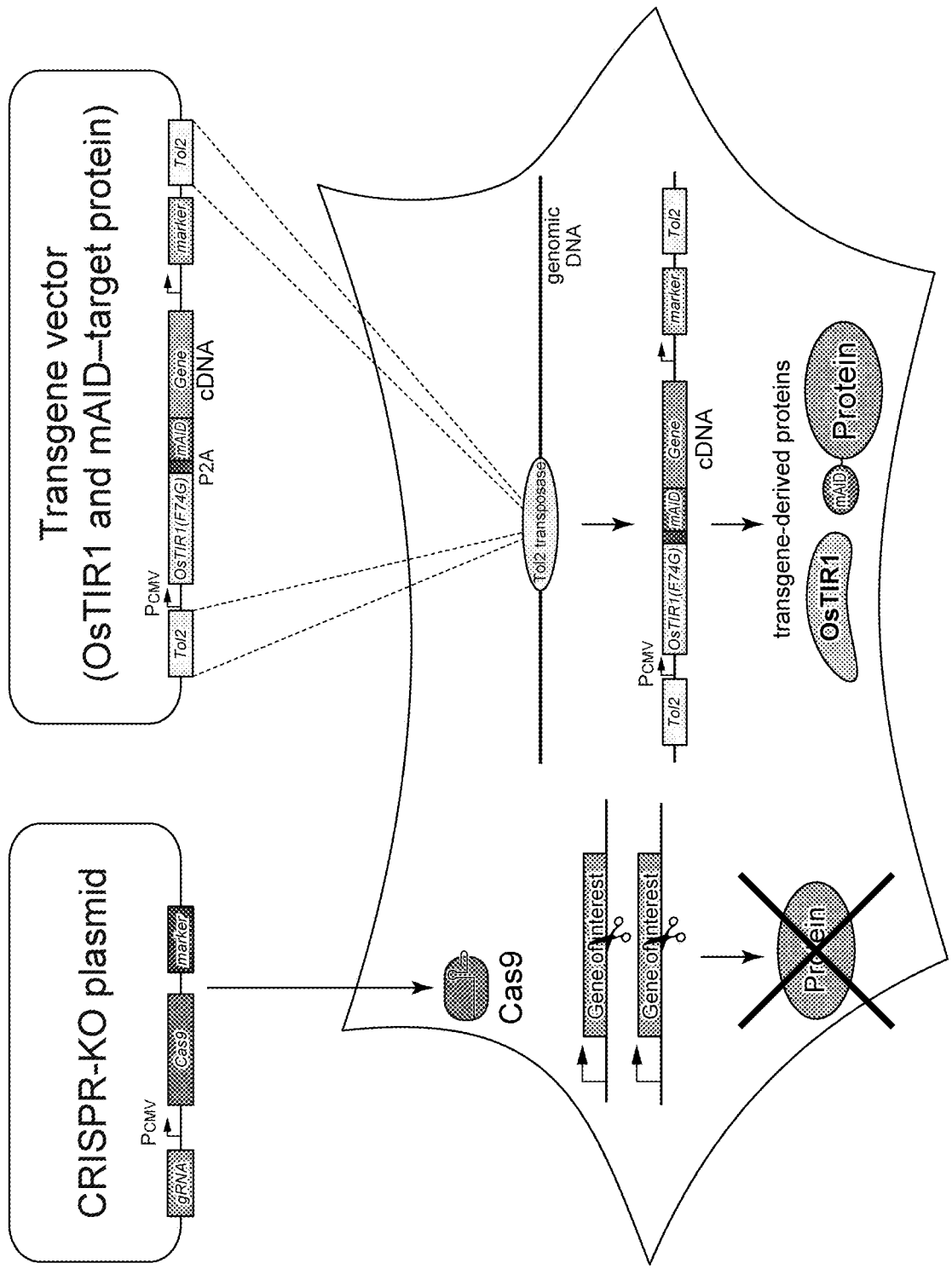
FIG. 5 is a conceptual view of a target protein degradation system.

In order to solve such problems, a new target protein degradation system shown in FIG. 5 was constructed. In this degradation system, (1) a transposon vector in which an OsTIR1(F74G) gene and an mAID-target gene are connected by a P2A linker gene and (2) a CRISPR-KO vector for knocking out an endogenous target gene containing gRNA and a Cas9 gene are contained.

In this degradation system, the OsTIR1(F74G) gene and the mAID-target gene in a genome are integrated by the transposon vector, and an endogenous target gene is knocked out by the CRISPR-KO vector.

Figure 6:
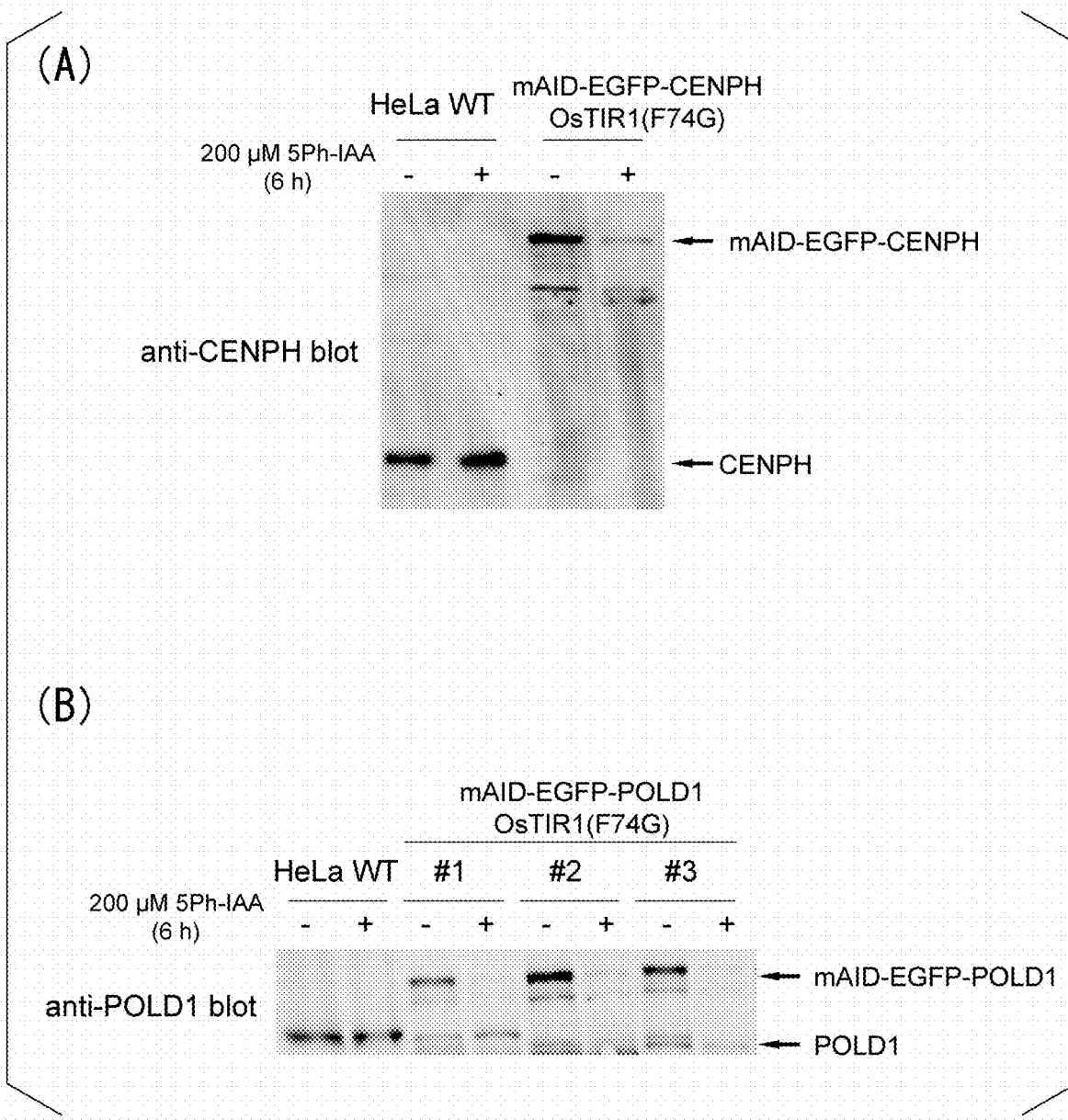
FIG. 6(A) shows the confirmation results of 5-Ph-IAA-dependent CENPH degradation by Western blotting.
FIG. 6(B) shows the confirmation results of 5-Ph-IAA-dependent POLD1 degradation by Western blotting.

The transposon vector in which an OsTIR1(F74G) gene and an mAID-EGFP-CENPH or mAID-EGFP-POLD1 target gene were connected by a P2A linker gene was constructed, and this vector was introduced into a HeLa cell together with the CRISPR-KO vector targeting an endogenous CENPH or POLD1 gene. 5-Ph-IAA was added to such a cell, and the degradation of the target protein was confirmed by Western blotting (FIG. 6).

FIG. 6(A) shows the result of the Western blotting in which an anti-CENPH antibody was used. It was confirmed that the endogenous CENPH gene was knocked out, and the degradation of mAID-EGFP-CENPH was confirmed in a 5-Ph-IAA-dependent manner.

FIG. 6(B) shows the result of the Western blotting in which an anti-POLD1 antibody was used. It was confirmed that, in the clones #1 to #3, the endogenous POLD1 gene was knocked out, and the degradation of mAID-EGFP-POLD1 was confirmed in a 5-Ph-IAA-dependent manner.

Example 5

Figure 12:
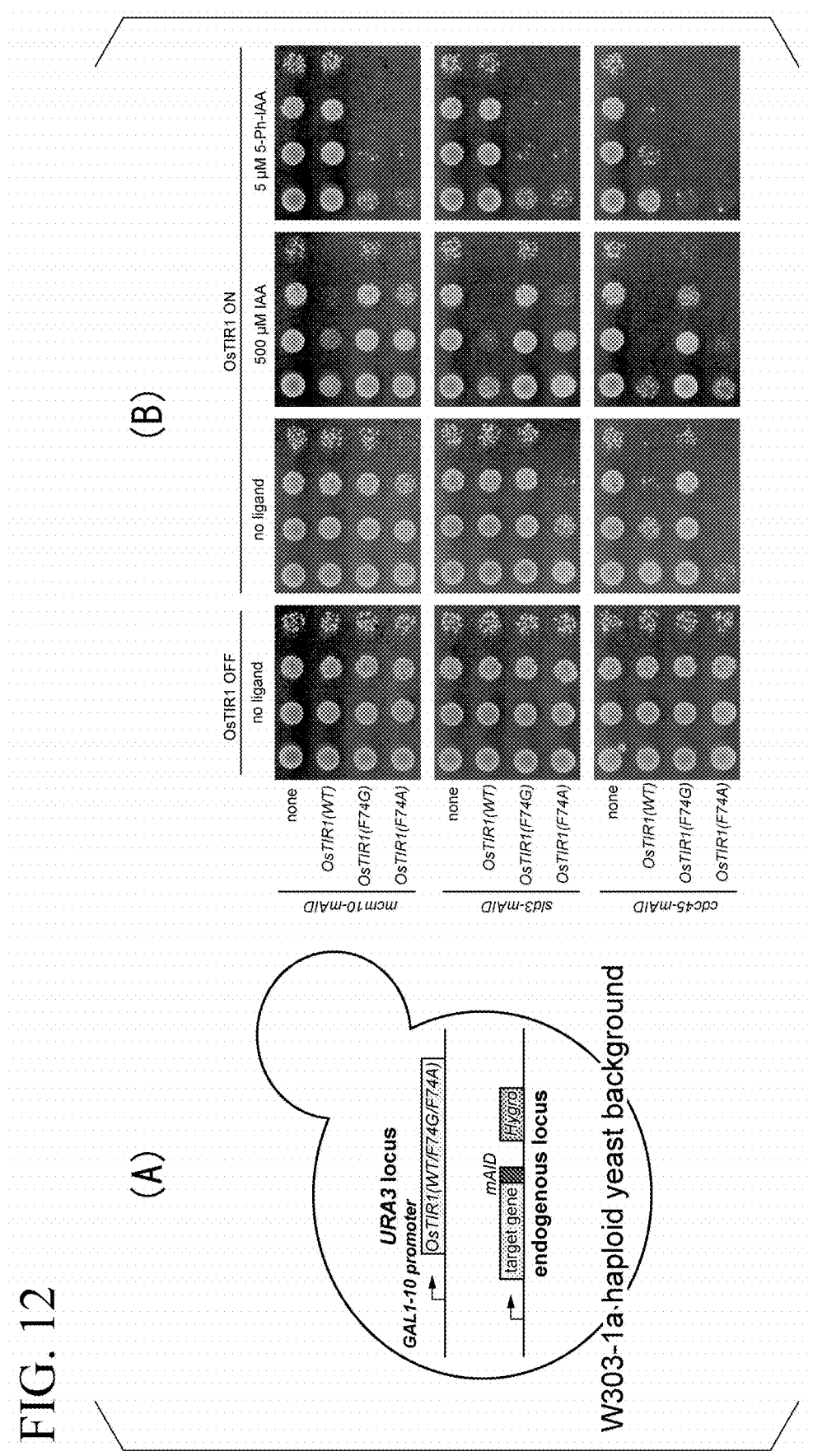
FIG. 12(A) is a view showing the overview of an experiment in Example 5.
FIG. 12(B) is a photograph showing the degree of colony formation on plates in each yeast strain.

In order to confirm that the AID2 system functions even in yeasts, OsTIR1(WT, F74G or F74A) was introduced into a URA3 gene locus under the control of a GAL1-10 promoter (refer to FIG. 12(A)). After that, an mAID tag was attached to a gene that encodes MCM10, SLD3 or CDC45, which is an essential replication initiator.

For example, as shown in OsTIR1 ON with no ligand, cdc45-mAID and the like in FIG. 12(B), yeast strains expressing OsTIR1(WT or F74A) showed slow growth, and it was suggested that higher basal degradation occurred in yeasts.

Furthermore, the fact that, in OsTIR1(WT and F74A), the growth suppression of these mAID-introduced strains was observed with 500 μM of IAA suggests that OsTIR1(F74A) was still reactive to IAA.

In all cases, strains expressing OsTIR1(F74G or F74A) showed strong growth inhibition on plates containing 5 μM of 5-Ph-IAA. In a case where OsTIR1(F74G or F74A) was expressed, the growth of mcm10-mAID strains and sld3-mAID strains was strongly inhibited, showing that the AID2 system has a higher degradation capability and is capable of producing mutant organisms having a strong phenotype.

Example 6

Figure 13:
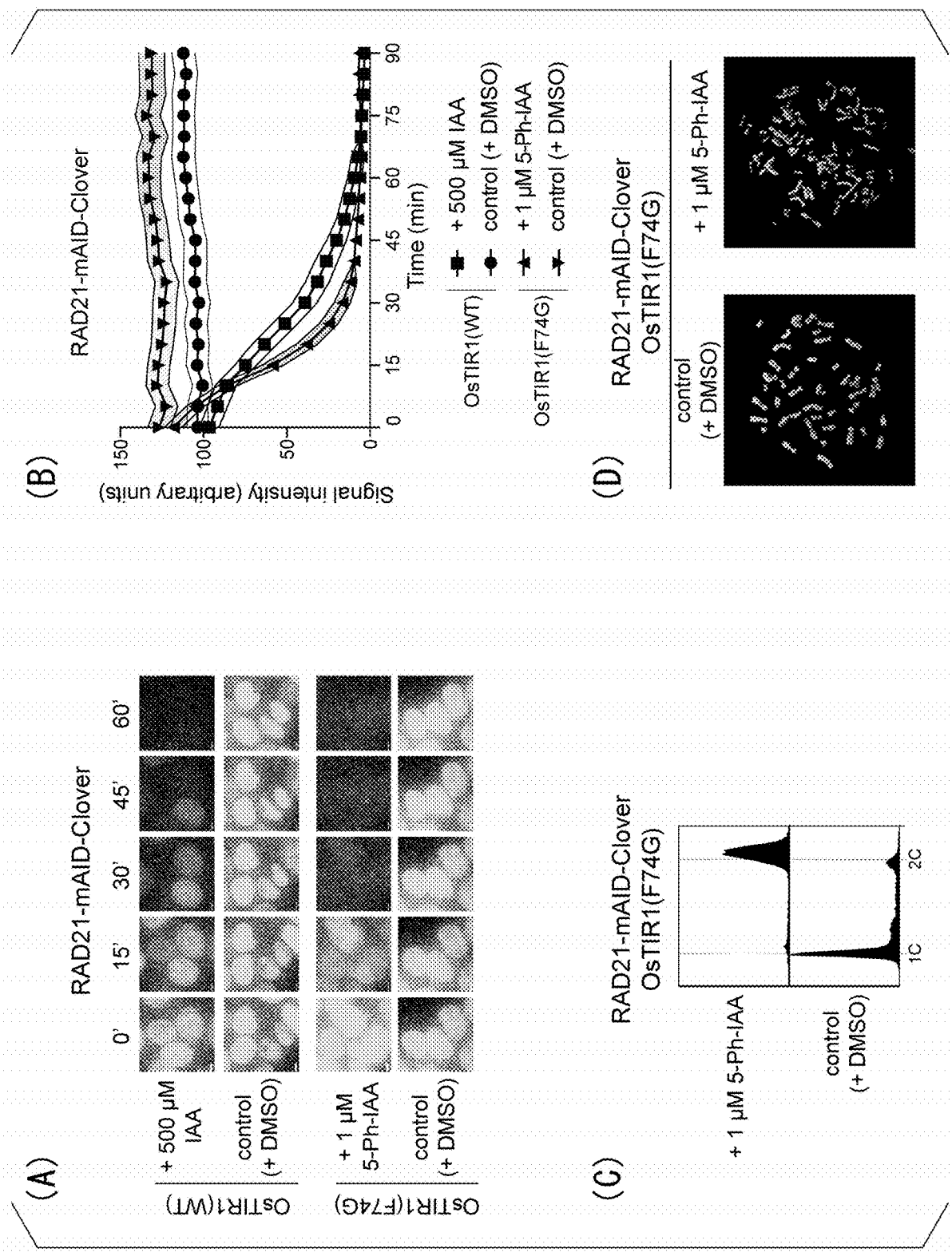
FIG. 13(A) is a photograph of the investigation of degradation of a reporter containing RAD21 in an RAD21-mAID-Clover (RAD21-mAC) cell expressing OsTIR1(WT) or OsTIR1(F74G).
FIG. 13(B) is a graph showing the result of inducing degradation of an RAD21 reporter over time in the RAD21-mAID-Clover (RAD21-mAC) cell expressing OsTIR1(WT) or OsTIR1(F74G).
FIG. 13(C) shows the investigation results of an influence of degradation of RAD21 on the cell cycle in the RAD21-mAID-Clover (RAD21-mAC) cell expressing OsTIR1(F74G).
FIG. 13(D) is a photograph of the investigation of an influence of the degradation of RAD21 on the agglomeration of sister chromatids in the RAD21-mAID-Clover (RAD21-mAC) cell expressing OsTIR1(F74G).

A human HCT116 cell constantly expressing OsTIR1 (F74G) was used as a material, an RAD21-mAID-Clover (RAD21-mAC) cell was generated by genome editing, and an effect of the addition of 5-Ph-IAA was confirmed. As shown in FIGS. 13(A) and (B), the expression level of RAD21-mAC was higher in a cell expressing OsTIR1 (F74G) than in a cell expressing OsTIR1(WT) at 0 minutes before addition, and basal degradation was shown in conventional AID systems.

RAD21-mAC rapidly disappeared after the addition of a ligand in both cases of OsTIR1(WT) and OsTIR1(F74G). Here, T1/2 was 26.5 minutes and 11.7 minutes in OsTIR1 (WT) and OsTIR1(F74G), respectively, and it was shown that RAD21-mAC was more rapidly degraded by the AID2 system. These results show that the AID2 system is capable of more rapidly controlling RAD21-mAC than conventional AID systems.

As a result of investigating the cell cycle in order to view the phenotype of the rapid RAD21-mAC degradation by the AID2 system, it was confirmed that the majority of the RAD21-mAC degraded cells were arrested in the G2/M phase (refer to FIG. 13(C)). The RAD21-mAC degraded cell coincided with the essential role of RAD21 and showed a profound defect in sister chromatidcohesion (refer to FIG. 13(D)).

Example 7

Figure 14:
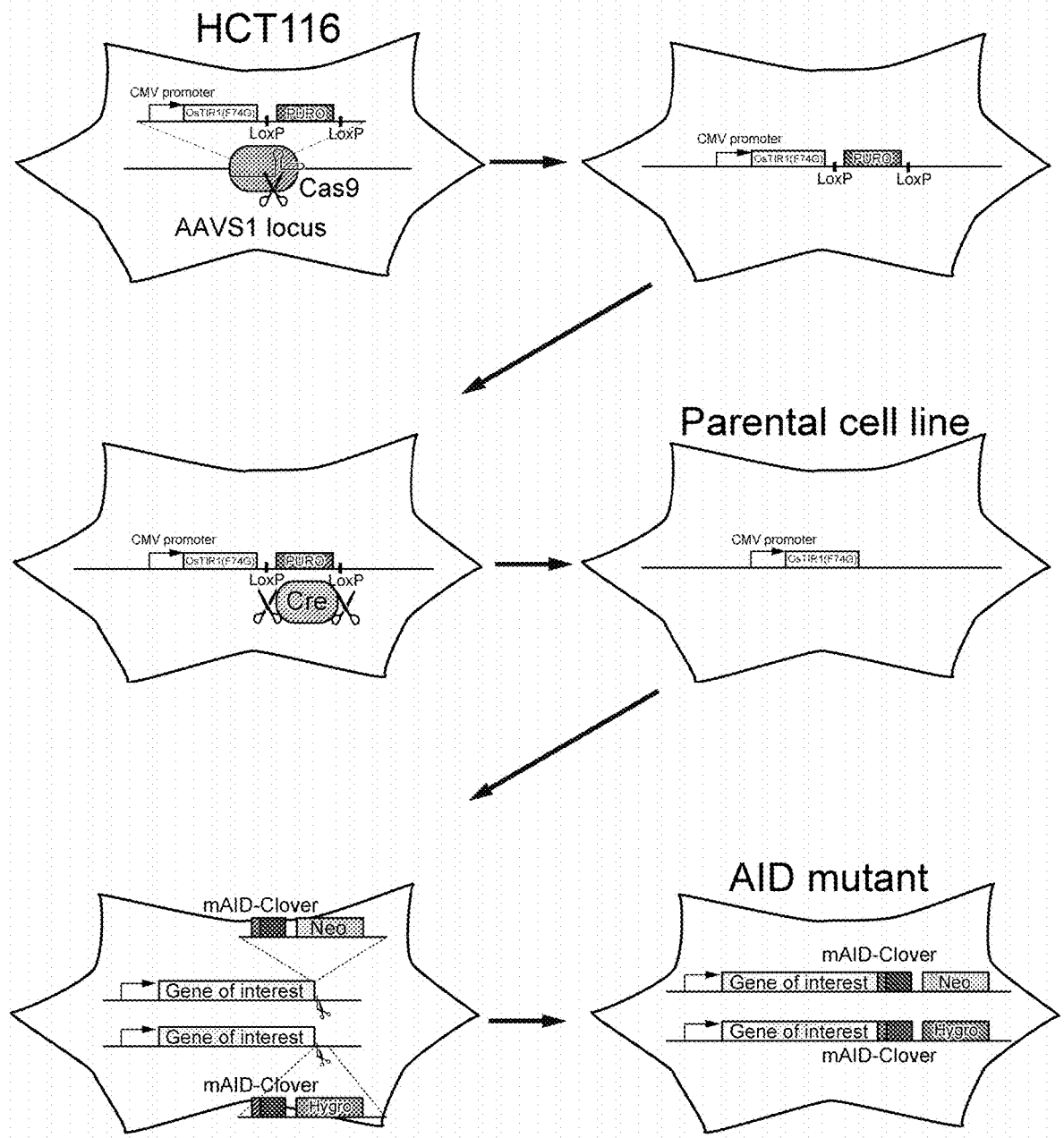
FIG. 14 is a view showing the overview of an experiment in Example 7.

In consideration of the fact that OsTIR1(F74G) shows lower basal degradation, whether or not DHC1-mAID-Clover (DHC1-mAC) can be generated in a HCT116 cell constantly expressing OsTIR1(F74G) was examined. A CRISPR plasmid for adding a degron tag and two donors each having a neomycin-resistant marker or a hygromycin-resistant marker were transfected into a parent cell line constitutively expressing OsTIR1(WT or F74G) (refer to FIG. 14). In an OsTIR1(F74G) expressing cell, a colony was formed in the presence of G418 and hygromycin, and tags were added to DHC1 genes at both alleles (refer to FIG. 15(A)). In a cell expressing OsTIR1(WT), no colony was formed. In a clone expressing OsTIR1(F74G), DHC1-mAC was more efficiently degraded by the addition of 1 µM of 5-Ph-IAA (refer to FIG. 15(B)). These cells were arrested in mitosis (refer to FIG. 15C) and showed a strong defect in mitotic spindle formation (refer to FIG. 15(D)). This coincides with the fact that DHC1 is essential for the formation of a spindle that is formed during mitosis.

Figure 15:
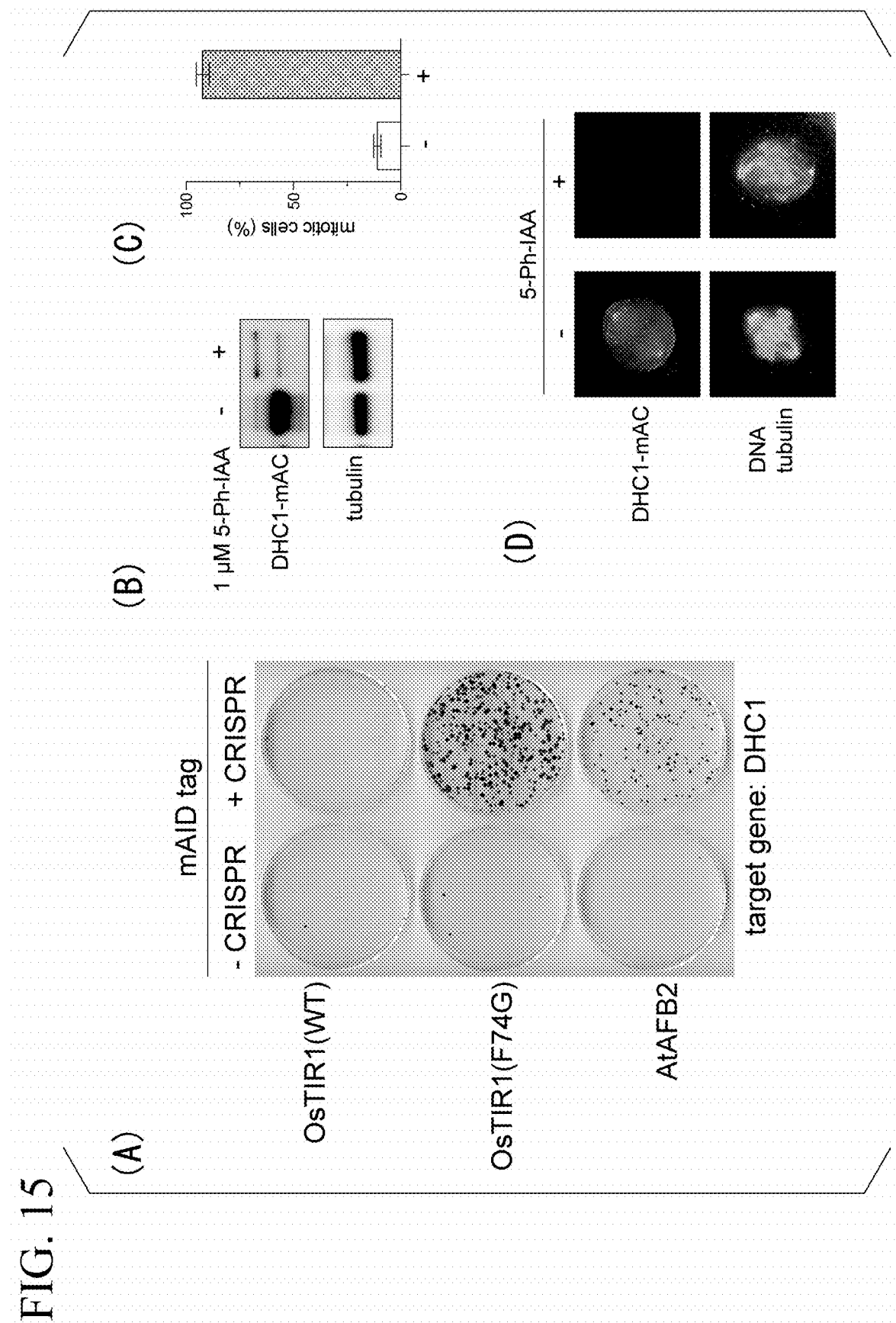
FIG. 15(A) is a photograph showing the presence or absence of colony formation in an OsTIR1(WT or F74G) or AtAFB2 expressing cell in which genome editing has been tried.
FIG. 15(B) shows the investigation results of degradation of DHC1-mAC by addition of 1 μM of 5-Ph-IAA in a cell expressing OsTIR1(F74G).
FIG. 15(C) is a graph showing the proportion of cells in an M period in a cell expressing OsTIR1(F74G) in which DHC1-mAC is degraded by the addition of 1 μM of 5-Ph-IAA.
FIG. 15(D) is a chromatic figure showing the state of a mitotic period in the cell expressing OsTIR1(F74G) in which DHC1-mAC is degraded by the addition of 1 μM of 5-Ph-IAA.

Furthermore, whether or not a DHC1-mAC mutant organism can be generated using AtAFB2, which is a TIR1 paralog of *Arabidopsis*, was examined. As shown in FIG. 15(A), it was possible to obtain colonies, but the number of the obtained colonies was small compared with that of OsTIR1(F74G).

Figure 16:
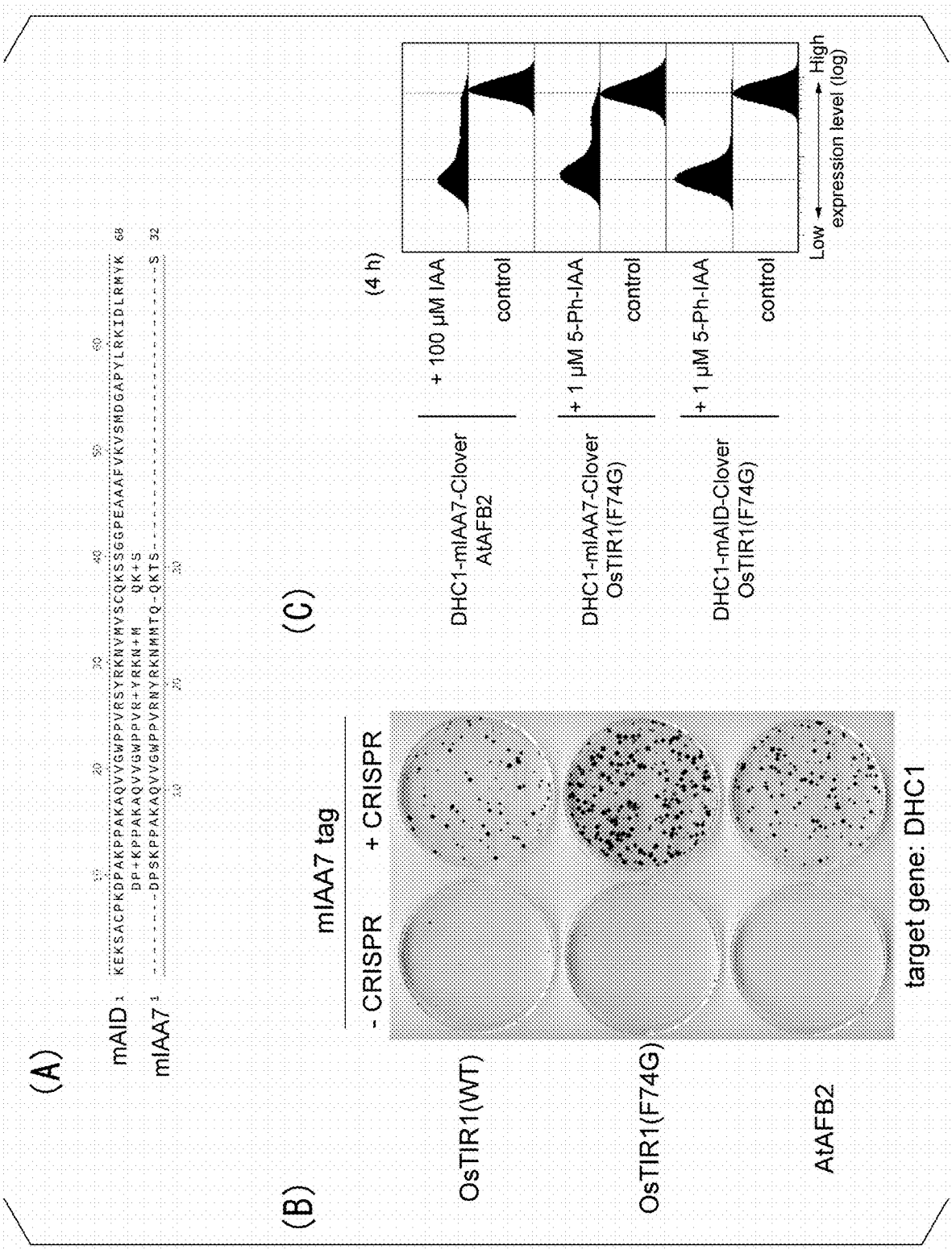
FIG. 16(A) shows alignments of amino acid sequences of mAID and mini-IAA7 (mIAA7).
FIG. 16(B) is a photograph showing the presence or absence of colony formation in an OsTIR1(WT or F74G) or AtAFB2 expressing cell in which genome editing is tried using mini-IAA7 (mIAA7).
FIG. 16(C) shows the FACS analysis results of degradation of a reporter when degradation of mIAA7 or mAID tag-attached DHC1 is induced in cells expressing AtAFB2 or OsTIR1 (F74G).

Furthermore, the same experiment was performed using, instead of mAID, mini-IAA7 (mIAA7) as another degron (refer to FIG. 16). As shown in FIG. 16(B), it was confirmed that a colony was formed under all conditions. Here, the number of colonies was small in cells expressing OsTIR1 (WT) and AtAFB2 compared with the cell expressing OsTIR1(F74G).

In the cells expressing AtAFB2 or OsTIR1(F74G), the degradation of mIAA7 or mAID tag-attached DHC1 was induced (refer to FIG. 16(C)). In FIG. 16(C), it was confirmed that a combination of OsTIR1(F74G) and an mAID tag was most efficient. This is considered to be because, as shown in FIG. 16(A), the length of mIAA7 was short and/or the number of lysine residues necessary for the ubiquitination of mIAA7 was small and thus the efficiency of ternary complex formation by IAA dropped.

Example 8

Figure 17:
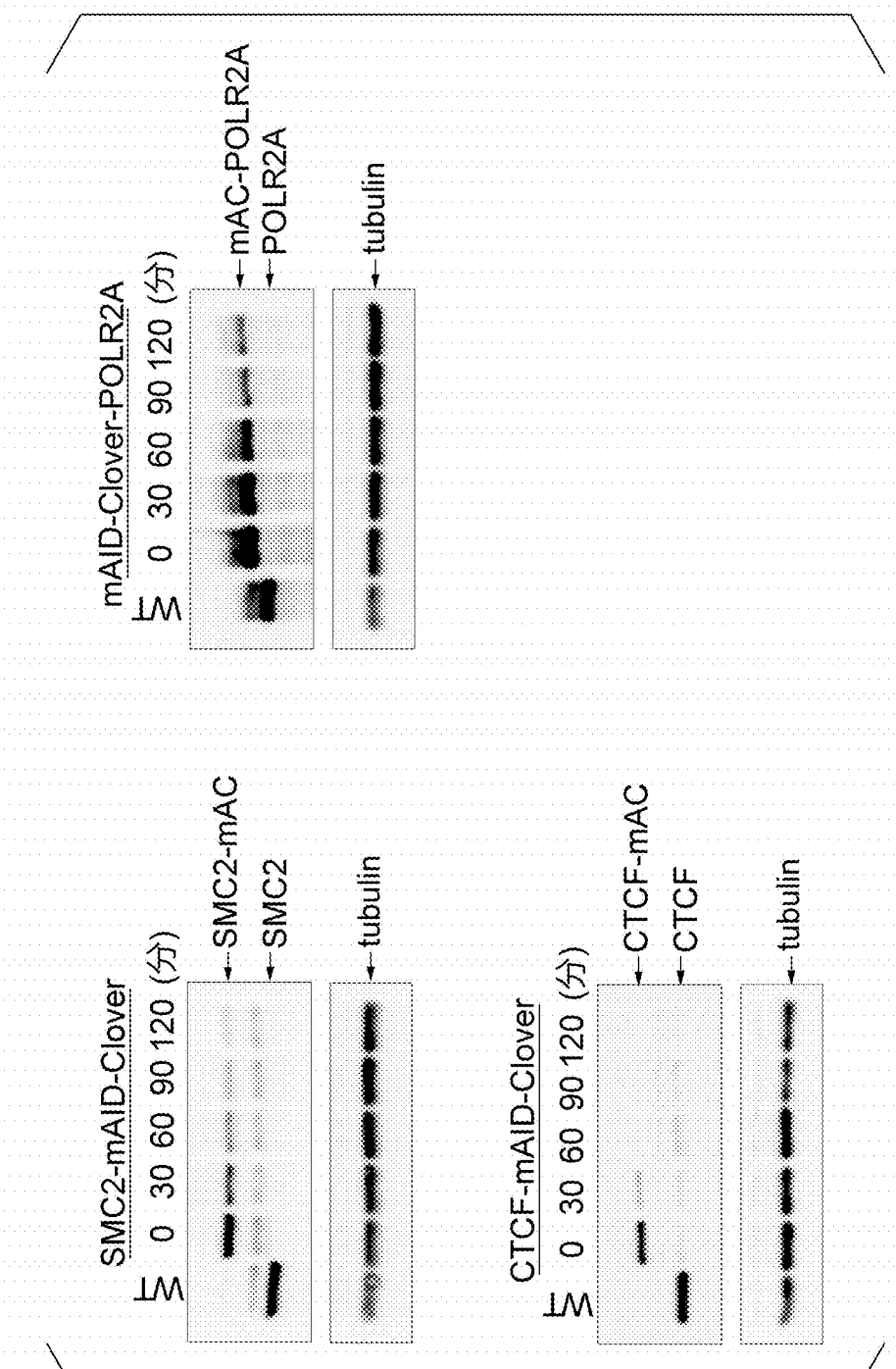
FIG. 17 shows the investigation results of degradation of SMC2, CTCF and POLR2A to which mAID is added by addition of 5-Ph-IAA in HCT116 constitutively expressing OsTIR1(F74G).

Regarding aSMC2 condensin complex, a CTCF insulator protein or the maximum subunit of RNA polymerase 2 (POLR2A) in which it was difficult to produce an AID cell line using an HCT116 cell constantly expressing OsTIR1 (WT), whether or not a cell line can be generated with a cell constitutively expressing OsTIR1(F74G) was examined. As shown in FIG. 17, it was confirmed that it was possible to attach tags to both alleles of endogenous SMC2, CTCF and POLR2A in the HCT116 constitutively expressing OsTIR1 (F74G). In these cell lines, mAID fused targets were rapidly degraded by the addition of 1 µM of 5-Ph-IAA. From these results, it was confirmed that the AID2 system in which a cell constitutively expressing OsTIR1(F74G) is used makes it possible to produce genes from which it is not possible to produce a cell line using former AID systems.

INDUSTRIAL APPLICABILITY

According to the auxin-inducible degron system of the present invention, since it is possible to inhibit auxin-independent target protein degradation, strict and full control of target protein degradation is possible.

The invention claimed is:

1. An auxin-inducible degron system kit that controls degradation of a target protein in a mammalian cell, the kit comprising:

a first nucleic acid that encodes a mutant F-box transport inhibitor response 1 (TIR1) family protein having a mutation at an auxin-binding site;

an auxin analog having an affinity to the mutant TIR1 family protein;

a second nucleic acid that encodes a degradation tag including at least a part of an Auxin/Indole acetic acid (Aux/IAA) family protein and having an affinity to a complex of the mutant TIR1 family protein and the auxin analog, wherein the mutant TIR1 family protein is a protein in which an F74 of *Oryza sativa* TIR1 (OsTIR1) has mutated into A, G or S; and a third nucleic acid that encodes the target protein linked upstream or downstream of the second nucleic acid, wherein the at least part of the Aux/IAA family protein is Mini-auxin-inducible degron (mAID) of which the amino acid sequence is SEQ ID NO. 8, and wherein the auxin analog is a compound of the following general formula (I-1) or an ester body thereof,

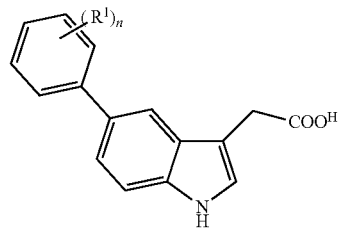

wherein in the general formula (I-1), $R^1$ is an alkyl group having 1 to 6 carbon atoms, an alkoxy group having 1 to 6 carbon atoms, or a halogen atom, n is an integer of 0 to 5, and, in a case where n is an integer of 2 to 5, n $R^1$s are identical to or different from each other.

2. The kit according to claim 1, further comprising: a fourth nucleic acid that encodes a linker for controlling a plurality of genes with one promoter and that is linked between the first nucleic acid, and the second nucleic acid and the third nucleic acid.

3. The kit according to claim 1, further comprising: a transposon vector containing the first nucleic acid, the second nucleic acid and the third nucleic acid.

4. The kit according to claim 2, further comprising: a target genome DNA cleavage enzyme that encodes an endogenous target protein or a fifth nucleic acid that encodes the enzyme.

5. The kit according to claim 1, further comprising: a mammalian cell having the first nucleic acid on a chromosome.

* * * * *